(12) United States Patent
Takashima

(10) Patent No.: US 10,684,166 B2
(45) Date of Patent: Jun. 16, 2020

(54) INFORMATION PROCESSING DEVICE, INFORMATION PROCESSING METHOD, AND PROGRAM

(71) Applicant: Sony Corporation, Tokyo (JP)

(72) Inventor: Masatoshi Takashima, Tokyo (JP)

(73) Assignee: Sony Corporation, Tokyo (JP)

( * ) Notice: Subject to any disclaimer, the term of this patent is extended or adjusted under 35 U.S.C. 154(b) by 100 days.

(21) Appl. No.: 16/083,560

(22) PCT Filed: Apr. 13, 2017

(86) PCT No.: PCT/JP2017/015063
§ 371 (c)(1),
(2) Date: Sep. 10, 2018

(87) PCT Pub. No.: WO2017/183546
PCT Pub. Date: Oct. 26, 2017

(65) Prior Publication Data
US 2019/0145819 A1     May 16, 2019

(30) Foreign Application Priority Data

Apr. 18, 2016    (JP) .................................. 2016-082992

(51) Int. Cl.
*G01J 1/42* (2006.01)
*G01J 3/51* (2006.01)
(Continued)

(52) U.S. Cl.
CPC .............. *G01J 1/4204* (2013.01); *G01J 1/44* (2013.01); *G01J 3/46* (2013.01); *G01J 3/51* (2013.01);
(Continued)

(58) Field of Classification Search
CPC .... G01J 1/4204; G01J 1/44; G01J 3/46; G01J 3/51; G01J 2001/4261; G01J 2001/4266; G01J 2003/467; G01W 1/12
See application file for complete search history.

(56) References Cited

U.S. PATENT DOCUMENTS

2015/0244915 A1* 8/2015 Kikuchi ................. H04N 5/265
                                                                    348/234

FOREIGN PATENT DOCUMENTS

| JP | 2011-223915 A | 11/2011 |
| JP | 2012-163482 A | 8/2012 |
| JP | 2015-132539 A | 7/2015 |

OTHER PUBLICATIONS

Navvab, Mojtaba "Integration of Daylighting and Sport Lighting Systems Design for Turf Growth in an Indoor Football Stadium", Journal of Illuminating Engineering Society., vol. 28, No. 2, Jul. 1, 1999, pp. 63-80, XPO55563583, US ISSN: 0099-4480.

(Continued)

*Primary Examiner* — Jamil Ahmed
(74) *Attorney, Agent, or Firm* — Michael Best & Friedrich LLP

(57) ABSTRACT

An information processing device configured to obtain an index with regard to light entering a measurement target region in a wider range is disclosed. The information processing device calculates, on a basis of a measured value of a reference reflection region, a reference index including a sunny place reference index and a shady place reference index, and calculates, on a basis of a measured value of a measurement target region obtained by performing sensing for the measurement target region and the reference index, a measurement target region index including a sunny measurement target region index being an index with regard to light entering a sunny region in the measurement target (Continued)

region and a shady measurement target region index being an index with regard to light entering a shady region in the measurement target region.

17 Claims, 24 Drawing Sheets

(51) Int. Cl.
  *G01W 1/12*   (2006.01)
  *G01J 1/44*   (2006.01)
  *G01J 3/46*   (2006.01)
(52) U.S. Cl.
  CPC ....... *G01W 1/12* (2013.01); *G01J 2001/4261* (2013.01); *G01J 2001/4266* (2013.01); *G01J 2003/467* (2013.01)

(56) References Cited

OTHER PUBLICATIONS

Extended European Search Report dated Mar. 14, 2019 for corresponding European Application No. 17785885.9.

* cited by examiner

FIG. 23
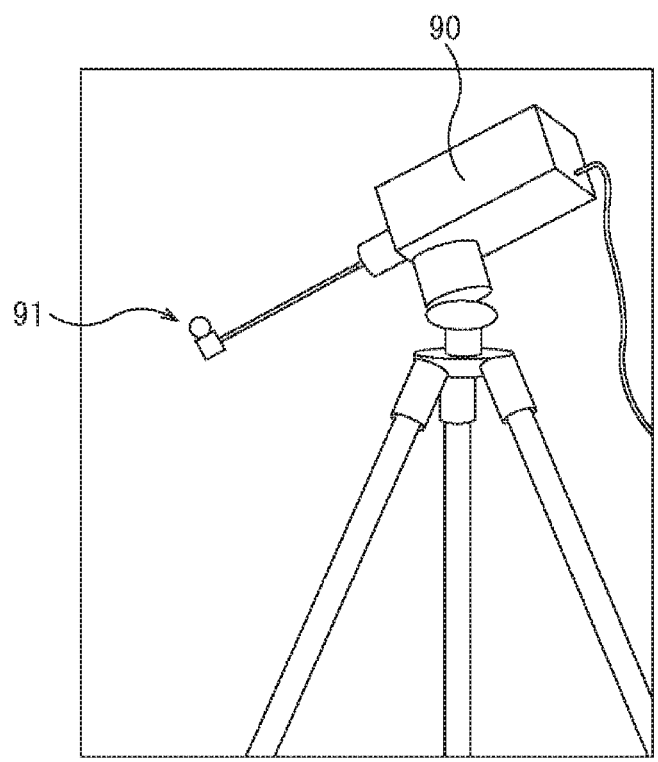
A
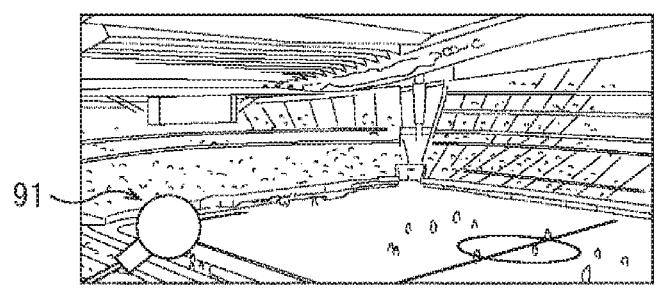
B

INFORMATION PROCESSING DEVICE, INFORMATION PROCESSING METHOD, AND PROGRAM

TECHNICAL FIELD

The present technology relates to an information processing device, an information processing method, and a program, in particular, relates to an information processing device, an information processing method, and a program that are capable of obtaining an index with regard to light entering a measurement target region in a wider range.

BACKGROUND ART

It has been known that photosynthesis of plants is influenced by the number of light quanta being particles of light, not the energy of light. Moreover, Patent Literature 1 discloses technology with regard to a light quantum meter for measuring photon flux density effective in photosynthesis of plants.

CITATION LIST

Patent Literature

Patent Literature 1: JP 2012-163482A

DISCLOSURE OF INVENTION

Technical Problem

By the way, the light quantum meter disclosed by the above-mentioned Patent Literature 1 is one that measures photon flux density effective for photosynthesis in a narrow region of a pinpoint. Accordingly, it is required to obtain an index with regard to light entering a measurement target region in a wider region.

The present technology has been achieved in view of such a situation, and is to make it possible to obtain an index with regard to light entering a measurement target region in a wider region.

Solution to Problem

An information processing device of one aspect of the present technology includes a calculating section that calculates, on a basis of a measured value of a reference reflection region obtained by performing sensing for the reference reflection region, a reference index including a sunny place reference index being an index with regard to light entering a sunny region in the reference reflection region and a shady place reference index being an index with regard to light entering a shady region in the reference reflection region, and calculates, on a basis of a measured value of a measurement target region obtained by performing sensing for the measurement target region and the reference index, a measurement target region index including a sunny measurement target region index being an index with regard to light entering a sunny region in the measurement target region and a shady measurement target region index being an index with regard to light entering a shady region in the measurement target region.

An information processing device of one aspect of the present technology may be an independent device, or may be an internal block constituting one device. Moreover, an information processing method or program of one aspect of the present technology is an information processing method or program corresponding to the above-mentioned information processing device of one aspect of the present technology.

An information processing device, an information processing method, and a program of one aspect of the present technology calculate, on a basis of a measured value of a reference reflection region obtained by performing sensing for the reference reflection region, a reference index including a sunny place reference index being an index with regard to light entering a sunny region in the reference reflection region and a shady place reference index being an index with regard to light entering a shady region in the reference reflection region, and calculate, on a basis of a measured value of a measurement target region obtained by performing sensing for the measurement target region and the reference index, a measurement target region index including a sunny measurement target region index being an index with regard to light entering a sunny region in the measurement target region and a shady measurement target region index being an index with regard to light entering a shady region in the measurement target region.

Advantageous Effects of Invention

According to one aspect of the present technology, it is possible to obtain an index with regard to light entering a measurement target region in a wider range.

Moreover, the advantageous effects mentioned here are not necessarily limited and any advantageous effect described in the present disclosure may be obtained.

BRIEF DESCRIPTION OF DRAWINGS

FIG. 23 is an illustration showing an arrangement example of a reference reflection plate.

MODE(S) FOR CARRYING OUT THE INVENTION

Hereinafter, embodiments of the present technology will be described with reference to the drawings. Moreover, the description will be made in the following order.

1. Outline of present technology
2. First embodiment: in case of having used PPFD filter, PPFD Value is calculated using reference reflection region
3. Second embodiment: in case of having used RGB filter, PPFD Value is calculated using reference reflection region and look-up table (LUT)
4. Modified example
5. Constitution of computer

1. Outline of Present Technology

Figure 1:
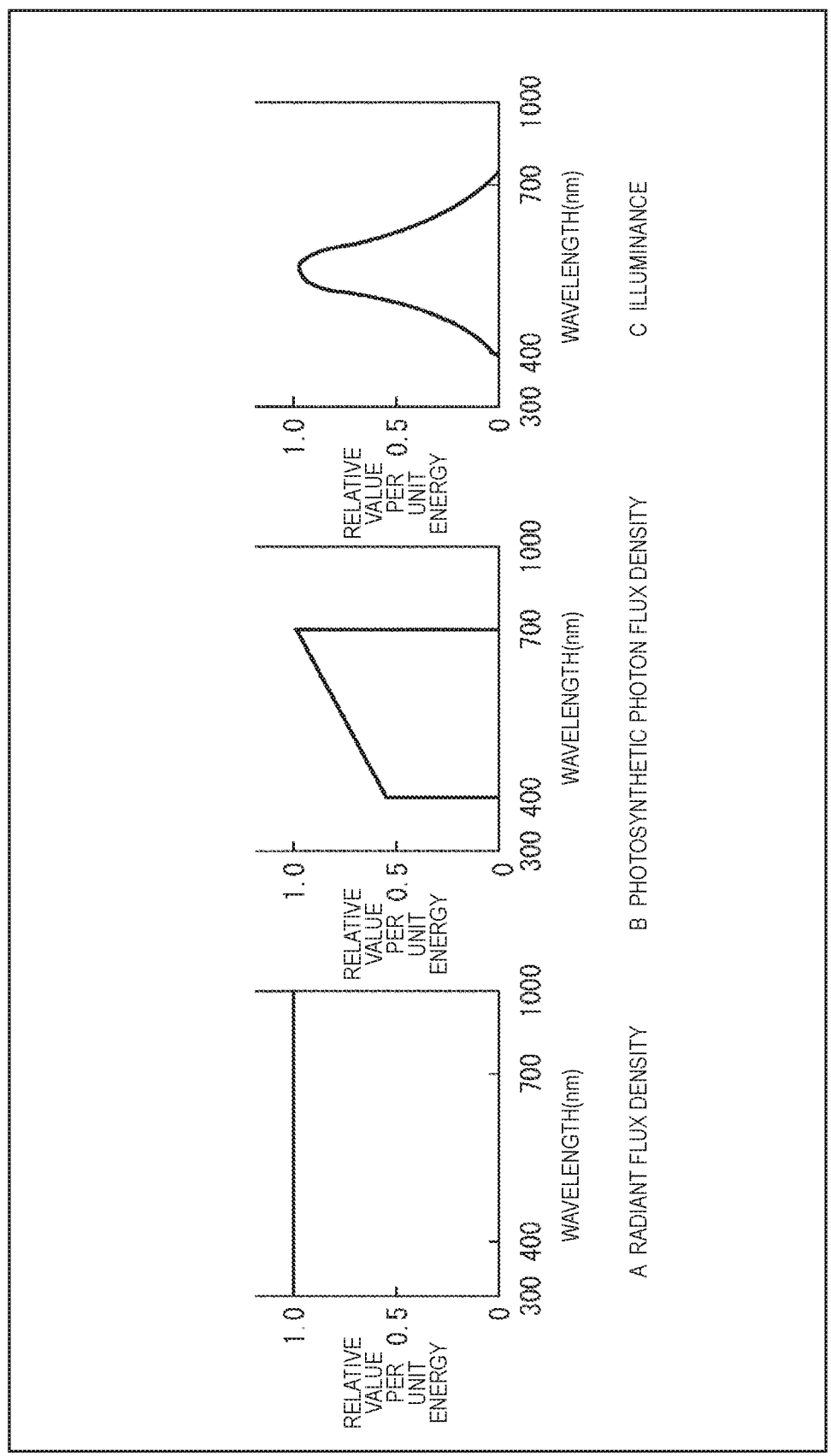
FIG. 1 is a diagram for describing units relevant to light.

FIG. 1 is a diagram for describing units relevant to light.

A in FIG. 1 is a diagram showing a relative value per unit energy in each wavelength of radiant flux density. The radiant flux density is the sum of energy intensity for each wavelength. Therefore, it becomes the same value at any wavelength, and the characteristics as a whole become flat. In this connection, the radiant flux density measured using a filter that passes only a wavelength range of 400 nm to 700 nm effective for photosynthesis is referred to as photosynthesis radiant flux density.

B in FIG. 1 is a diagram showing a relative value per unit energy in each wavelength of photosynthetic photon flux density. Here, the photosynthesis of plants depends on the number of light quanta (photons) that are particles of light, not light energy. One represented by the number of photons entering per unit area in unit time at wavelengths from 400 nm to 700 nm corresponding to the absorption wavelength of chlorophyll (chlorophyll), is photosynthetic photon flux density (PPFD). That is, the photosynthetic photon flux density (PPFD) is a unit expressed with the number of light quanta (photons) that are particles of light, not the energy of light.

C in FIG. 1 is a diagram showing a relative value per unit energy in each wavelength of illuminance. The illuminance has characteristics that match the sensitivity of human eyes. Therefore, in the case where light with constant energy as shown in A in FIG. 1 is irradiated, as shown in C in FIG. 1, it has the characteristics that energy becomes zero at the wavelengths of 400 nm or less and 700 nm or more. That is, the illuminance is a unit that has nothing to do with the photosynthesis of plants, and the light environment of plants cannot be evaluated by using this unit.

In plants, light becomes a very important factor as an environmental condition that influences growth. However, in here, it is important to consider light as particles. Therefore, the photosynthetic photon flux density (PPFD) shown in B in FIG. 1 is defined as an index that indicates how much light entering the plants acts on photosynthesis.

Moreover, in recent years, increasing are scenes that require strict managements of vegetation, such as management of lawn in a stadium and management of plants in precision farming. In particular, in management of lawn in stadiums, such as a soccer stadium, a need with regard to strict management of vegetation is high.

Figure 2:
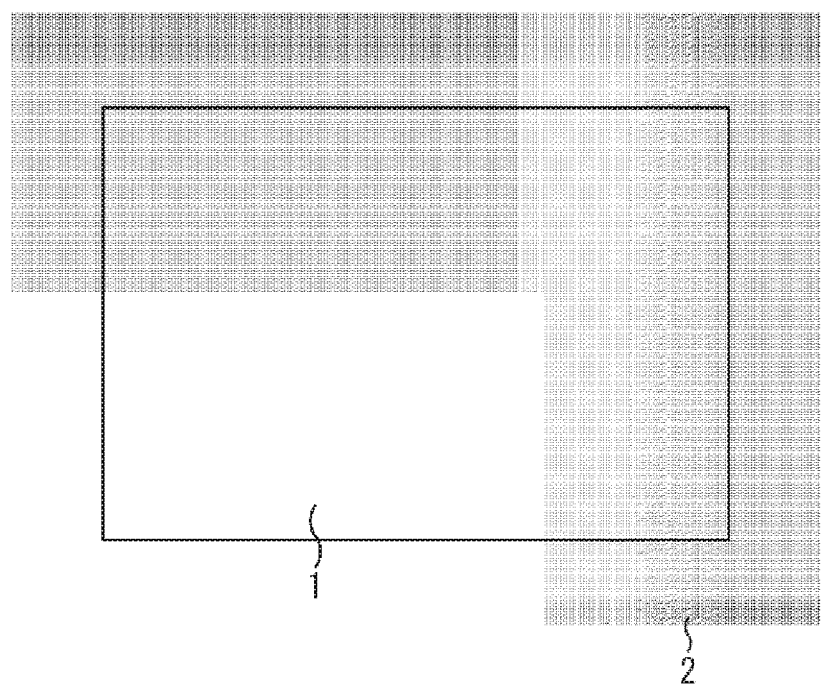
FIG. 2 shows an example of a vegetation area in a stadium.

FIG. 2 shows an example of a vegetation area in a stadium. In FIG. 2, a shady area 2 which is a region of the shade by a building of the stadium, overlaps with a vegetation area 1 which is a region of the lawn (vegetation) of the stadium. In FIG. 2, about ⅔ of the vegetation area 1 becomes shady. Here, in the shady area 2 overlapping with the vegetation area 1, its region changes with time, and further, also depending on seasons, weathers, and the like, its state changes greatly.

By the way, the light quantum meter disclosed by the above-mentioned Patent Literature 1 is one that measures photon flux density effective for photosynthesis in a narrow region of a pinpoint, and, cannot grasp a state of plants in a wide range like the vegetation area 1 in the stadium. In particular, in the shady area 2 overlapping with the vegetation area 1 in the stadium, its state changes greatly correspondingly to time, seasons, weathers, and the like. Accordingly, it becomes still more difficult to grasp its state.

Therefore, desired is technology for obtaining the photosynthetic photon flux density (PPFD) for plants in a wide range like the vegetation area 1 in the stadium. The present technology makes it possible to obtain the photosynthetic photon flux density (PPFD) in a wide range like the vegetation area 1 in the stadium.

Hereinafter, a calculation method of the photosynthetic photon flux density (PPFD) according to the present technology will be described. Here, first, as the first embodiment, in the case of having used a filter (PPFD filter) corresponding to the PPFD, a constitution in the case of obtaining the photosynthetic photon flux density (PPFD) in a vegetation area by using a reference reflection region with a known reflectance, is described. Moreover, after that, as the second embodiment, in the case of having used a filter (RGB filter) corresponding to RGB, a constitution in the case of obtaining the photosynthetic photon flux density (PPFD) in a vegetation area by using a look-up table (LUT: Look Up Table) prepared in advance together with the reference reflection region, is described. In this connection, in the following description, the photosynthetic photon flux density (PPFD) is also referred to as a PPFD value.

2. First Embodiment: In Case of Having Used PPFD Filter, PPFD Value is Calculated Using Reference Reflection Region (Constitution of Index Calculating Device)

Figure 3:
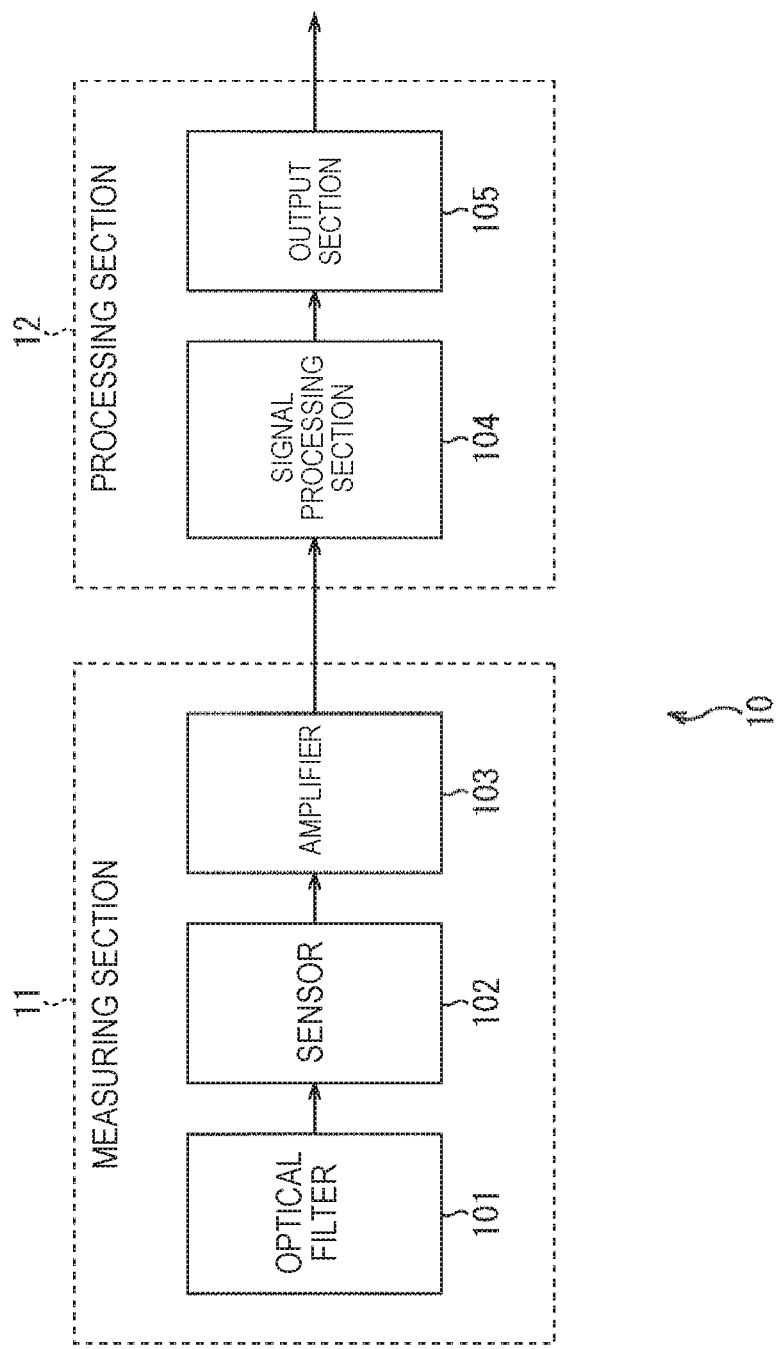
FIG. 3 is a diagram showing a constitution example of an index calculating device in the first embodiment.

FIG. 3 is a diagram showing a constitution of one embodiment (the first embodiment) of the index calculating device to which the present technology is applied.

The index calculating device 10 is a device to perform sensing for a measurement target region and to calculate an index with regard to light entering the measurement target region. Here, the sensing means measuring the measurement target region. Moreover, the sensing includes imaging the measurement target region. Moreover, an image acquired by imaging the measurement target region includes, in addition to a visible image acquired from visible light, an image acquired from light other than the visible light, such as infrared light (infrared light ray). In this way, although an image is included in a measurement signal (measured value) acquired by the sensing, it may be information other than the image.

Moreover, in the following description, the description is given for a case where, as the measurement target region, a region with regard to vegetation is made a target, and, as its index (measurement target region index), a PFFD value (photosynthetic photon flux density (PPFD)) is calculated.

In FIG. 3, the index calculating device 10 includes a measuring section 11 that includes an optical filter 101, a sensor 102, and an amplifier 103 and a processing section 12 that includes a signal processing section 104 and an output section 105.

The optical filter 101 is an optical filter corresponding to the PPFD value. That is, the optical filter 101 is a filter to enable the sensor 102 in a latter stage to detect light corresponding to the PPFD value. Therefore, the light having passed through the optical filter 101 has the similar characteristics as the photosynthetic photon flux density (PPFD) shown in B in FIG. 1.

The sensor 102 is a sensor that includes, on its sensor surface, a pixel array section in which a plurality of pixels is arranged two-dimensionally. The sensor 102 performs sensing for light having passed through the optical filter 101 with the plurality of pixels arranged two-dimensionally on the pixel array section, thereby outputting measurement signals (measured value) corresponding to an amount of the light to the amplifier 103.

In this connection, the optical filter 101 can be constituted as an on chip filter on the upper portion of the plurality of pixels arranged two-dimensionally on the pixel array section of the sensor 102.

The amplifier 103 amplifies the measurement signals output from the sensor 102, and outputs to the signal processing section 104.

The signal processing section 104 includes circuits, such as a CPU (Central Processing Unit) and a FPGA (Field Programmable Gate Array), calculates the PPFD value (measurement target region index) of a measurement target region by performing predetermined signal processing for the measurement signals (measured value) output from the amplifier 103, and outputs to the output section 105.

The detailed contents of this signal processing will be mentioned later. However, in here, for example, from measured values obtained by performing sensing for, in addition to a vegetation area becoming a measurement target region, a reference reflection region (a reference area of a sunny place and a shady place) with a known reflectance, the PPFD value of the sunny place (sunny place reference index) and the PPFD value of the shady place (shady place reference index) in the reference area are calculated. Then, in this signal processing, by using the PPFD values (reference indexes) of the sunny place and the shady place in the reference area, it is possible to calculate a PPFD value (measurement target region index) that includes the PPFD value of a sunny place (sunny measurement target region index) and the PPFD value of a shady place (shady measurement target region index) in a vegetation area.

In this connection, in the reference reflection region, there are one in which the characteristic of a spectral reflectance becomes flat (in the case where the transverse axis represents wavelength (nm) and the longitudinal axis represents spectral characteristic, as shown in A in later-mentioned FIG. 5, the value of the characteristic of the spectral reflectance becomes constant) and one in which the characteristic of a spectral reflectance does no become flat (in the case where the transverse axis represents wavelength (nm) and the longitudinal axis represents spectral characteristic, as shown in B in later-mentioned FIG. 5, the value of the characteristic of the spectral reflectance does no become constant). Its detailed contents are also mentioned later.

The output section 105 includes an external output interface circuit etc., processes the PPFD values of the measurement target region output from the signal processing section 104, and outputs as numeric data or image data (for example, data of a two-dimensional graph of B in later-mentioned FIG. 8 and a three-dimensional graph in FIG. 9) to an external device such as a display device such as a display and a memory device such as a semiconductor memory. With this, for example, it is possible to make the display device display an image corresponding to the PPFD value of the vegetation area or to make the memory device memorize the numeric data or image data of the PPFD value.

The index calculating device 10 is constituted as mentioned in the above.

(PPFD Value Calculating Process)

Figure 4:
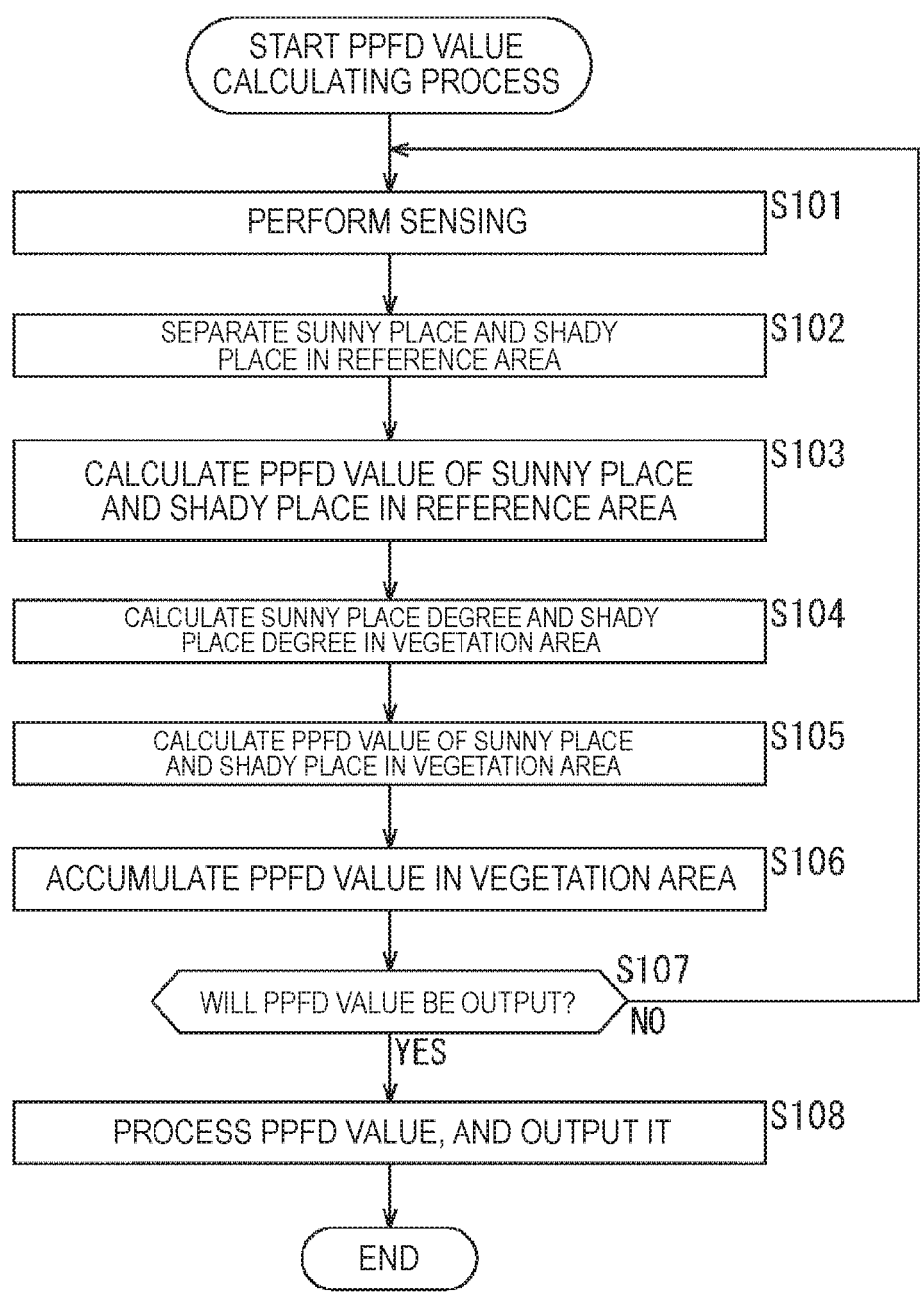
FIG. 4 is a flowchart for describing a flow of a PPFD value calculating process in the first embodiment.

Next, with reference to a flowchart in FIG. 4, a flow of a PPFD value calculating process in the first embodiment executed by the index calculating device 10 in FIG. 3 is described.

In Step S101, the measuring section 11 performs sensing for a photographic subject. Here, for example, in the case where a measurement target region becomes a vegetation area 1 (FIG. 2) being a region of lawn (vegetation) in a stadium, sensing is performed for a reference area (for example, a gray reflection plate or en-tout-cas) as a reference reflection region with a known reflectance together with this vegetation area 1. Here, the en-tout-cas is formed on a region around the region of lawn that becomes a vegetation area 1 in a stadium, such as a soccer stadium. Since its reflection characteristic is almost constant and can be measured in advance, it can be used as a reference area.

In this connection, an image corresponding to the measured value obtained by the process in Step S101 becomes an image (hereinafter, also referred to as a PPFD correspondent image) corresponding to a PPFD value acquired from light having passed through the optical filter 101 that is disposed at the former stage of the sensor 102 and corresponds to the PPFD value.

Moreover, the characteristics of the spectral transmittance of the optical filter 101 is decided depending on whether the characteristic of the spectral reflectance of a reference area is flat or not. For example, FIG. 5 shows a relationship between the spectral transmission characteristic of the optical filter 101 and the spectral reflection characteristics of a reference area in the case where the transverse axis represents wavelength (nm) and the longitudinal axis represents spectral characteristic (spectral characteristic in the case where reflectance or transmittance is expressed by being normalized to a range of 0.00 to 1.00).

Figure 5:
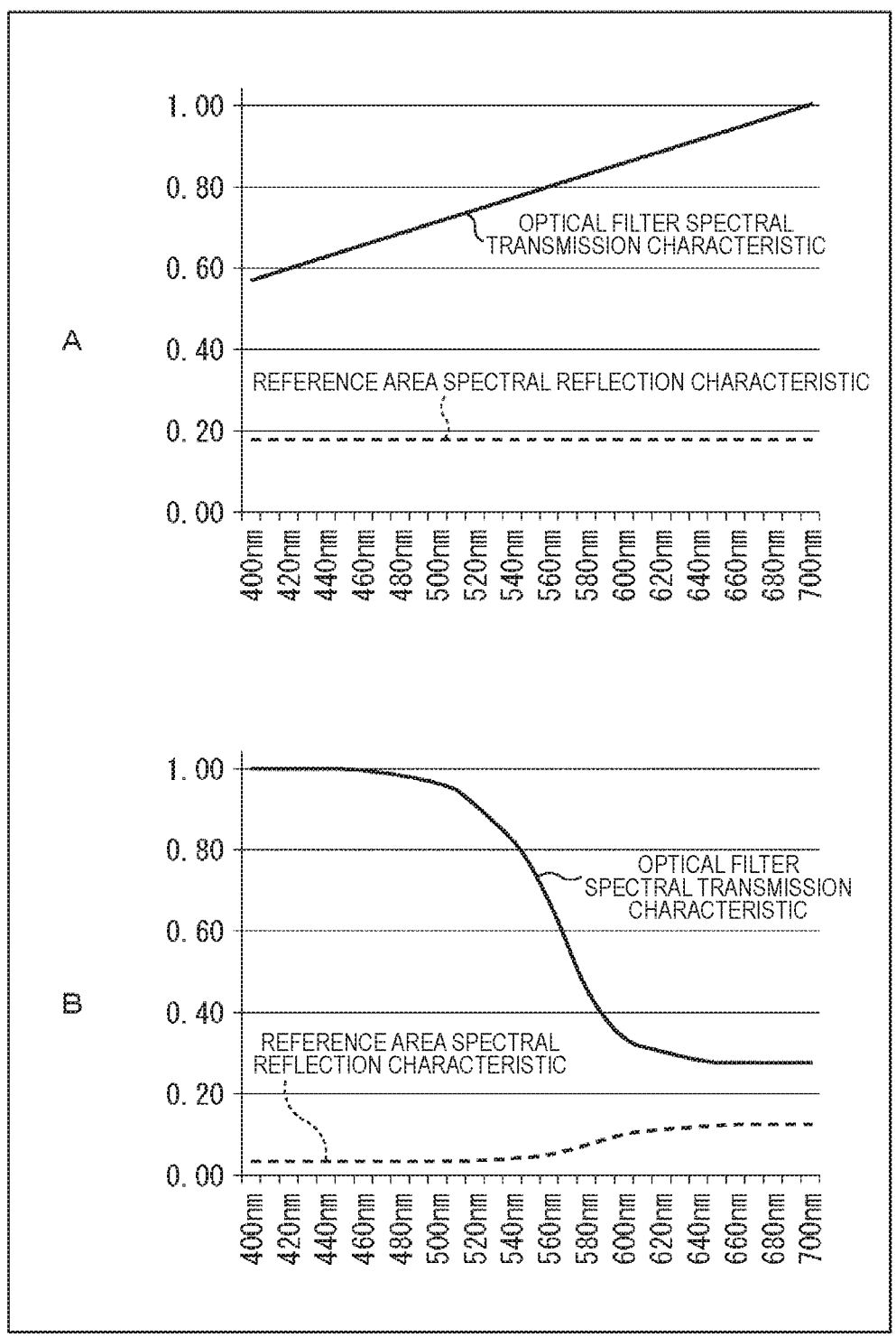
FIG. 5 is a diagram showing relationship between an optical filter and a reference reflection region.

For example, in the case where a gray reflection plate is used as a reference area, as shown in A in FIG. 5, the value of its spectral reflection characteristic becomes constant at about 0.18, and the characteristics of a spectral reflectance becomes flat. In this case, as shown in A in FIG. 5, the spectral transmission characteristic of the optical filter 101 is made to become an almost straight line inclining upward to the right in which as the wavelength becomes larger, the value of the spectral transmittance becomes larger correspondingly to the spectral reflection characteristic of the gray reflection plate with a known reflectance.

On the other hand, for example, in the case where en-tout-cas is used as a reference area, as shown in B in FIG. 5, since the value of its spectral reflection characteristic fluctuates from about 0.04 to about 0.15, the characteristic of a spectral reflectance does not become flat. In this case, as shown in B in FIG. 5, as the optical filter 101, one having a curve corresponding to the spectral reflection characteristic of the en-tout-cas with a known reflectance is used In Step S102, the signal processing section 104 processes the PPFD correspondent image obtained by the process in Step S101, and separates a sunny region and a shady region in a reference area. In here, since a shady area 2 by a building in a stadium may overlap with a vegetation area 1 and a reference area in the stadium, by performing predetermined signal processing, the sunny region and the shady region in the reference area are separated.

As the predetermined signal processing for separating a sunny region and a shady region, for example, by performing processing using a luminance level obtained from a PPFD correspondent image obtained by the process in Step S101, a reference area included in the PPFD correspondent image can be separated into either region of a sunny region and a shady region.

In this connection, in the case where a luminance level cannot be obtained from a PPFD correspondent image, a luminance level (information corresponding to it) may be created, for example, on the basis of measurement signals obtained from a plurality of pixels of the sensor 102. Moreover, in here, although the signal processing having used the luminance level has been described as one example, various kinds of known techniques can be used as long as they can separate a reference area included in a PPFD correspondent image into a sunny region and a shady region.

In Step S103, the signal processing section 104 calculates the PPFD values of the sunny region and the shady region of the reference area on the basis of the processing result in Step S102. In here, since a value proportional to a PPFD value is output as a measured value (PPFD correspondent image) from the amplifier 103, the signal processing section 104 can calculate the PPFD value of the sunny region and the PPFD value of the shady region in the reference area only by multiplying this measured value by a certain constant.

In Step S104, the signal processing section 104 calculates a sunny place degree and a shady place degree (degree of each of a sunny place and a shady place) for each predetermined region of a vegetation area by processing the PPFD correspondent image obtained in the process in Step S101. In here, the vegetation area 1 in the stadium is divided into a plurality of regions, and a sunny place degree and a shady place degree are calculated for each of the divided regions. For example, among the vegetation area 1, in a divided region that does not overlap with the shady area 2 at all, the sunny place degree becomes 100%. On the other hand, among the vegetation area 1, in a divided region that overlaps with the shady area 2 thoroughly, the shady place degree becomes 100%.

In Step S105, the signal processing section 104 calculates the PPFD values of a sunny place and a shady place in a vegetation area on the basis of the PPFD values of the sunny region and the shady region in the reference area calculated in the process in Step S103 and the sunny place degree and the shady place degree for each of the divided regions in the vegetation area calculated in the process in Step S104.

Namely, in here, a reference area as a reference reflection region with a known reflectance is arranged on both a sunny place and a shady place, and the PPFD value of each of a sunny region and a shady region in the reference area is calculated. Then, by using the PPFD values calculated in this way, the PPFD value of a sunny region and a shady region in a vegetation area 1 as a measurement target region is made to be calculated.

In Step S106, the signal processing section 104 or the output section 105 accumulates the PPFD values of the vegetation area calculated in the process in Step S105. In this connection, besides the signal processing section 104 or the output section 105, the PPFD values of the vegetation area may be made to be accumulated by other blocks (not-illustrated) in the processing section 12. Moreover, in the present specification, accumulation means recording data temporarily or permanently.

In Step S107, it is determined whether to output the PPFD values accumulated in the process in Step S106. In this connection, in here, for example, correspondingly to a user's instruction, existence or nonexistence of an output can be determined.

In Step S107, in the case where it has been determined not to output the PPFD values, the process returns to Step S101, and the processes of Steps S101 through S107 are repeated. With this, in the index calculating device 10, the PPFD values of the vegetation area 1 where a sunshine situation changes greatly under the influence of the shady area 2 in which its state changes greatly correspondingly to time, seasons, weathers, etc., are accumulated in time series.

Then, in Step S107, in the case where it has been determined to output the PPFD values, the process is made to proceed to Step S103. In Step S108, the output section 105 processes (totals) the PPFD values of the vegetation area accumulated in the process in Step S106, and outputs as numeric data or image data (for example, data of a two-dimensional graph of B in later-mentioned FIG. 8 and a three-dimensional graph in FIG. 9) to an external device such as a display device such as a display and a memory device such as a semiconductor memory. With this, for example, it is possible to make the display device display an image corresponding to the PPFD values of the vegetation area or to make the memory device memorize the numeric data and image data of the PPFD values.

In the above, the flow of the PPFD value calculating process in the first embodiment has been described. Here, with reference to FIG. 6 and FIG. 7 through FIG. 9, the PPFD value calculating process (FIG. 4) of the first embodiment is described more concretely.

(Example of Calculation of PPFD Value)

Figure 6:
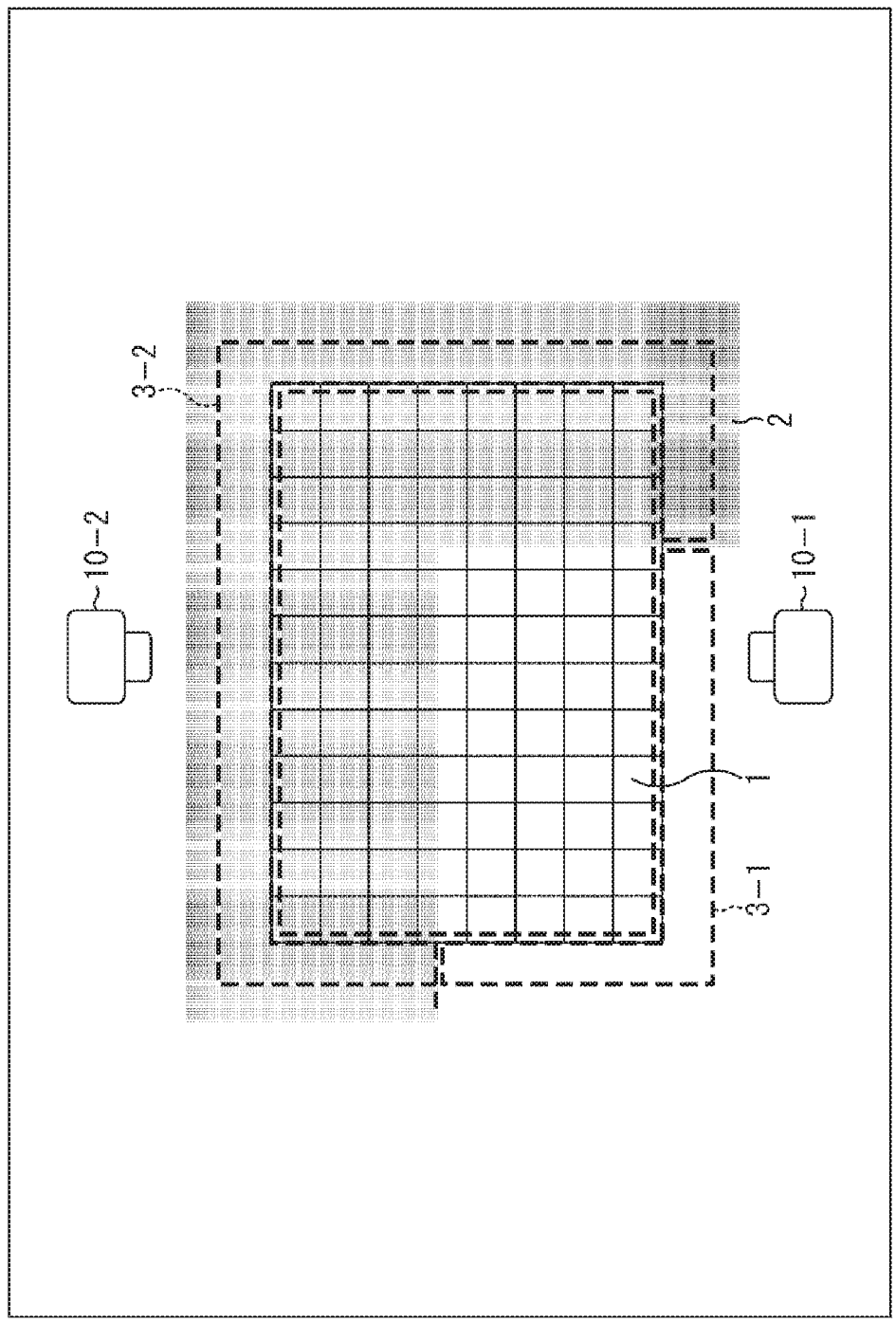
FIG. 6 is a diagram showing a calculation example of a PPFD value of a vegetation area in a stadium.

In FIG. 6, a vegetation area 1 being a region of lawn (vegetation) in a stadium is schematically shown. Moreover, a shady area 2 being the region of the shade by a building in a stadium, is overlapping with the vegetation area 1 in this stadium. As mentioned in the above, in the shady area 2 overlapping with the vegetation area 1, its region changes with time, and further, also depending on seasons, weathers, and the like, its state changes.

Moreover, a region around the vegetation area 1 becoming a measurement target region becomes a reference area 3 as a reference reflection region with a known reflectance. As this reference area 3, for example, a gray reflection plate, en-tout-cas, etc, in which a reflectance is known can be used. However, the optical filter 101 has a spectral transmission characteristic corresponding to the spectral reflection characteristic of the reference area 3. Moreover, the reference area 3 is divided into a sunny place reference area 3-1 located in a sunny region and a shady place reference area 3-2 located in a shady region.

In here, as shown in FIG. 6, by installing two index calculating devices 10, i.e., an index calculating device 10-1 and an index calculating device 10-2 at positions each of which is a part of the vegetation area 1 in the stadium, but, from which wide ranges can be looked out over, the whole vegetation area 1 being a measurement target region can be subjected to sensing by the measuring section 11-1 of the index calculating device 10-1 and the measuring section 11-2 of the index calculating device 10-2 (S101 in FIG. 4). However, it is assumed that, at the time simultaneous with, or different from the vegetation area 1, the reference area 3 around it is also subjected to the sensing (S101 in FIG. 4).

In this connection, in the example in FIG. 6, a case where the whole vegetation area 1 is subjected to sensing by the two index calculating devices 10, i.e., the index calculating device 10-1 and the index calculating device 10-2, has be exemplified. However, the number of the index calculating devices 10 is not limited to two, and depending on the installation position, the sensing for the whole vegetation area 1 can be performed by one index calculating device 10 or a plurality of index calculating devices 10. Moreover, in the case of installing a plurality of index calculating devices 10, a plurality of measuring sections 11 may be installed at positions from which the vegetation area 1 can be looked out over to a wide range, and the processing section 12 to process measured values from the measuring section 11 may be made common with the processing section 12 of the other index calculating device 10.

That is, as long as only the measuring section 11 including the sensor 102 among the constitution components of the index calculating device 10 is installed at the position from which the vegetation area 1 can be looked out over, the processing section 12 may be made to be installed at any place. Moreover, the whole vegetation area 1 may be made to be subjected to sensing by moving the measuring section 11 (sensor 102) of a single index calculating device 10.

Upon sensing the vegetation area 1 and the reference area 3 around it, the processing section 12 (its signal processing section 104) processes the PPFD correspondent image corresponding to its measured values, and separates a sunny place reference area 3-1 and a shady place reference area 3-2 (S102 in FIG. 4). As the separating process, for example, signal processing using a luminance level is performed as having stated previously. Then, the processing section (its signal processing section 104) calculates the PPFD value of the sunny place reference area 3-1 and the PPFD value of the shady place reference area 3-2 (S103 in FIG. 4).

In here, in the measuring section 11-1 of the index calculating device 10-1 and the measuring section 11-2 of the index calculating device 10-2, since light having passed through the optical filter 101 corresponding to a PPFD value has been subjected to the sensing by the sensor 102, from the amplifier 103, as a measured value, a value proportional to the PPFD value is output. Therefore, in the processing section 12 (its signal processing section 104), the PPFD value can be calculated only by multiplying the measured value (value proportional to the PPFD value) output from the amplifier 103 by a predetermined constant. Moreover, in here, for example, the PPFD value can be calculated from the average value of the whole region of each reference area 3, or the average value of some regions.

Next, the processing section 12 (its signal processing section 104) divides the vegetation area 1 being a measurement target region into a plurality of regions by processing the PPFD correspondent image, and calculates a sunny place degree and a shady place degree for each of the divided regions (S104 in FIG. 4).

In here, in the example in FIG. 6, as shown with longitudinal and transverse solid lines on the vegetation area 1, the vegetation area 1 is divided into twelve sections in the transverse direction, and is divided into eight sections in the longitudinal direction. Thus, in each of the divided regions divided into 12×8, a sunny place degree and a shady place degree are calculated correspondingly to a ratio of the area of a sunny place and the area of a shady place. For example, among the divided regions divided into 12×8 in the vegetation area 1, in a divided region that does not overlap with the shady area 2 at all, a sunny place degree becomes 100% (a shady place degree is 0%), on the other hand, in a divided region that overlaps with the shady area 2 thoroughly, a shady place degree becomes 100% (a sunny place degree is 0%).

Moreover, among the divided regions divided into 12×8 in the vegetation area 1, in a divided region where a part of its region overlaps with the shady area 2, a sunny place degree and a shady place degree can be calculated correspondingly to a ratio of the area of a sunny place and the area of a shady place in its region. Provided that, in a divided region intermediate between a sunny region and a shady region, in the cas of adding a sunny place degree and a shady place degree, its value becomes 100%.

Next, the processing section 12 (its signal processing section 104) calculates the PPFD value of the sunny place and the shady in the vegetation area 1 being a measurement target region (S105 in FIG. 4). Here, the PPFD value of each of the division regions in the vegetation area 1 is calculated by the following equation (1).

$$\text{PPFD value} = (\text{sunny place degree} \times \text{PPFD value of sunny reference area}) + (\text{shady place degree} \times \text{PPFD value of shady reference area}) \quad (1)$$

That is, the PPFD value of each of the divided regions in the vegetation area 1 can be obtained by calculating each of the PPFD value of a sunny place and the PPFD value of a shady, and thereafter, by adding the PPFD values of them. In this way, by obtaining the PPFD value of each of the divided regions in the vegetation area 1, as a result, the PPFD values of the whole vegetation area 1 are obtained, and can be accumulate in time series (S106 in FIG. 4).

In here, until it is determined to output the PPFD values of the vegetation area 1 ("YES" in S107 in FIG. 4), the accumulation of the PPFD values of the vegetation area 1 is continued ("NO" in SI 07 in FIG. 4). Then, when it has been determined to output the PPFD values of the vegetation area 1, the processing section 12 (its output section 105) processes (totals) the accumulated PPFD values, and outputs (S108 in FIG. 4).

In this connection, in the process in Step S106 in FIG. 4, the PPFD values of the vegetation area 1 (each of the divided regions of it) are accumulated. However, in here, the PPFD value of a sunny place and the PPFD value of a shady place of each of the divided regions in the vegetation area 1 may be accumulated separately, and then, may be made to be processed (totaled) in the process in Step S108 at the latter stage.

Moreover, in here, the process in Step S107 and the process in Step S108 are replaced such that the processing (totaling) of the accumulated PPFD values is performed continuously (S108 in FIG. 4), and, in the case where it has been determined to output ("YES" in S107 in FIG. 4), the processed (totaled) PPFD value may be made to be output.

(Example of Totaling of PPFD Value)

Figure 7:
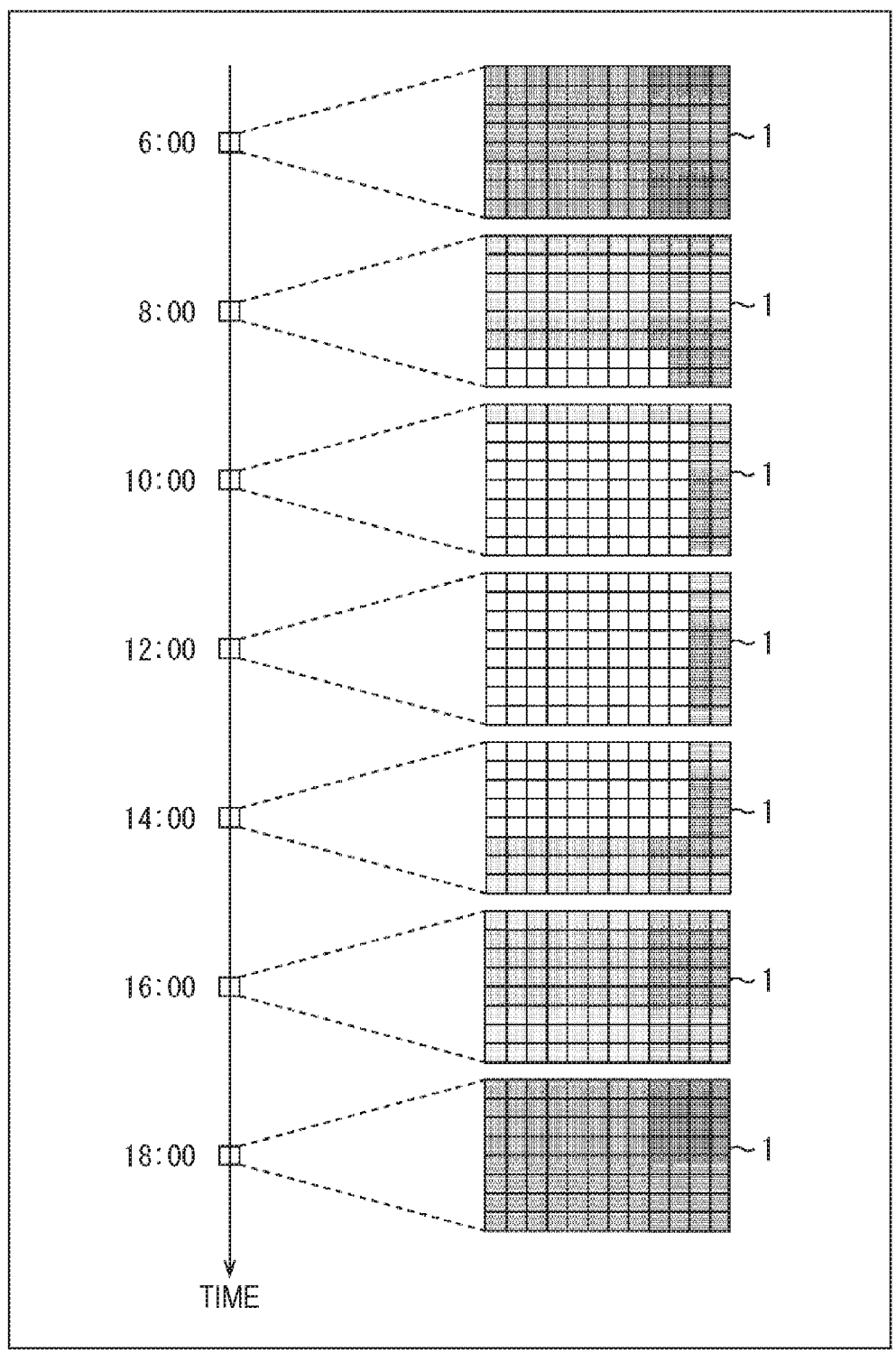
FIG. 7 is an illustration showing a change in a sunshine situation on a vegetation area in time series.

Next, an example of totaling of PPFD values is described. In FIG. 7, a change in a sunshine situation on the vegetation area 1 being a region (field) of lawn (vegetation) in a stadium is shown in time series. In this connection, in FIG. 7, a sunshine situation on a region of the vegetation area 1 is expressed with light and shade. Accordingly, it expresses such that, as its density is thinner, it is brighter, and as its density is thicker, it is darker.

In FIG. 7, an example where sensing is performed for the vegetation area 1 for every two hours during a period from 6:00 to 18:00, is shown. Since 6:00 is still before sunrise, there is no light, and the vegetation area 1 becomes in a state where the whole is dark. At 8:00, the sun appears, and light comes to hit a region on the lower side of the vegetation area 1. Moreover, a shady portion also becomes bright as a whole as compared with the case of 6:00.

At 10:00, the sun rises gradually, and while a region of the vegetation area 1 where light is hitting is being expanded, a region of the shady portion is being reduced. Then, at 12:00, the sun becomes the highest and the brightest state, and, as compared with the case of 10:00, the region of the vegetation area 1 where light is hitting has been expanded, but, on a right side region, a shady portion (shady area 2) by a building in a stadium remains.

After that, at 14:00, as compared with the case of 12:00, a shady portion is gradually beginning to be formed on a region on a lower side of the vegetation area 1 in FIG. 7. Then, at 16:00, the whole surface of the vegetation area 1 becomes a shady state. Moreover, since, at 18:00, it becomes after the sunset, the vegetation area 1 becomes a state where the whole is dark.

Here, in the processing section 12 (its signal processing section 104), it is possible to calculate and total the PPFD value of each of the divided regions divided into 12×8 by dividing the vegetation area 1 into twelve sections in the transverse direction and eight sections in the longitudinal direction as shown with longitudinal and transverse solid lines on the vegetation area 1 shown in FIG. 7. Namely, in the processing section 12, by the PPFD value calculating process (FIG. 4), since the PPFD values of the vegetation area 1 are calculated and accumulated continuously (S101 through S106), it is possible to total the PPFD values accumulated in time series in this way for each of the divided regions in the vegetation area 1 (S108).

Figure 8:
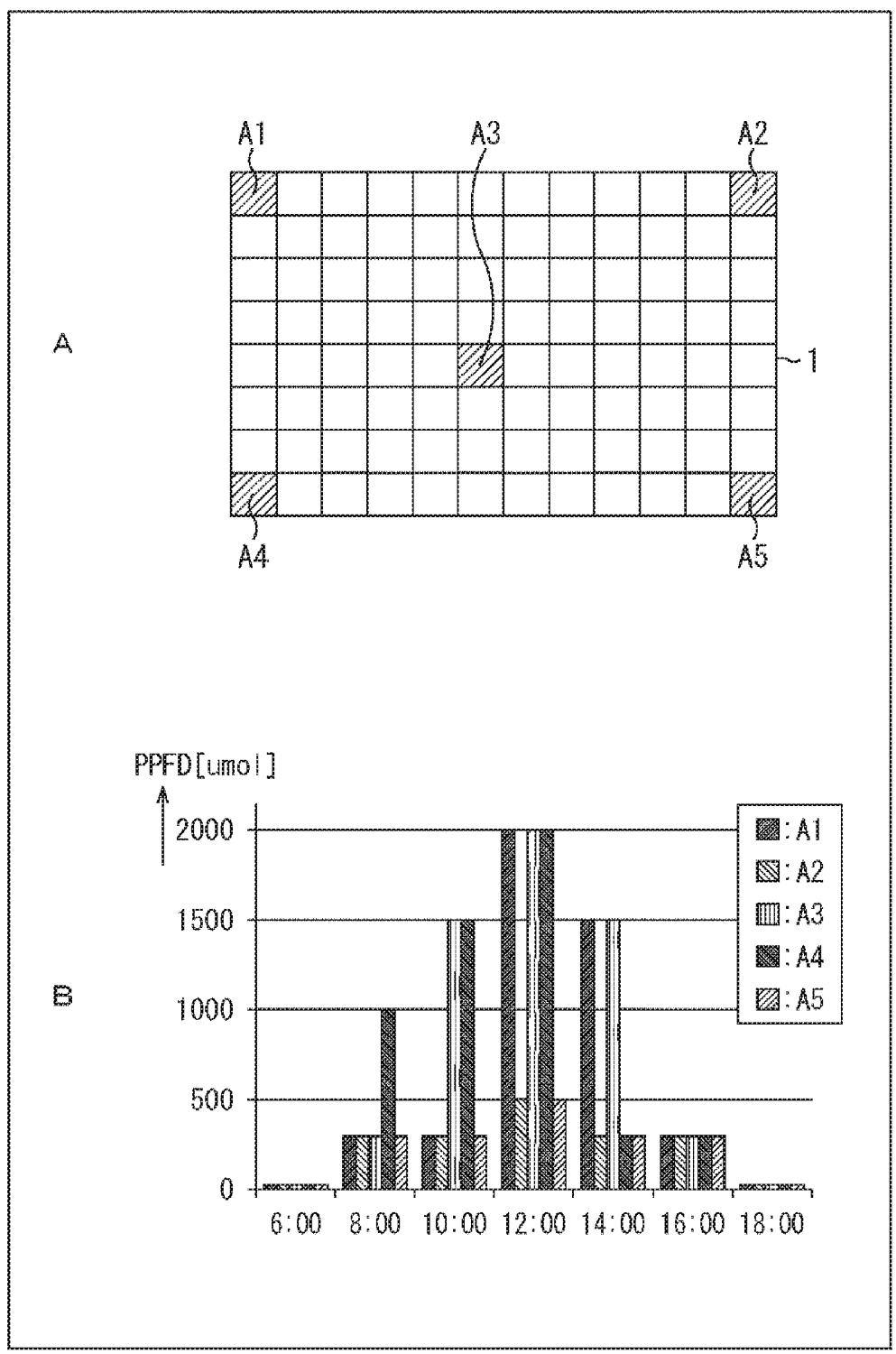
FIG. 8 is a diagram showing an example of indication of a PPFD value of each time slot for each divided region in a vegetation area.
Figure 9:
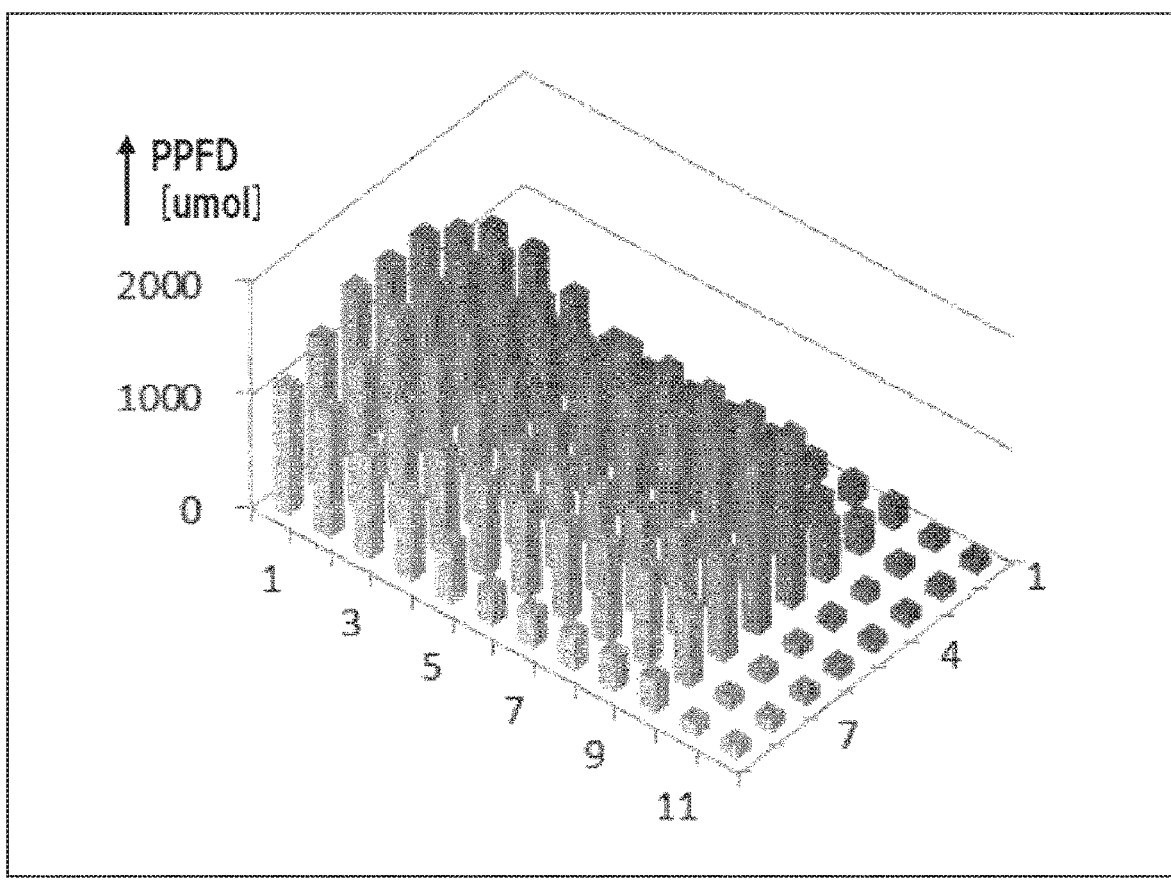
FIG. 9 is an illustration showing an example of indication of a daily average value of a PPFD value for each divided region in a vegetation area.

In concrete terms, as shown in A in FIG. 8, it is supposed a case where, among the divided regions divided into 12×8 in the vegetation area 1, five divided regions of a divided region A1 through a divided region A5 (regions at four corners and almost center) are selected as divided regions being noticed (noticed region). Then, in the case where the PPFD values in the five selected noticed regions are totaled for each predetermined time slot, it becomes as shown in B in FIG. 8, in B in FIG. 8, the PPFD value of each of the noticed region A1 through the noticed region A5 in each time slot (in units of two hours during a period of from 6:00 to 18:00 corresponding to FIG. 7) is shown. With this, even in the case of a wide region like the vegetation area 1 in the stadium, it is possible to intuitively recognize a region having a high PPFD value and a region having a low PPFD value among the noticed regions for each time slot.

Moreover, for vegetation such as the vegetation area 1 etc., in order to observe light effective for photosynthesis, the daily average value of the PPFD values is important. In the case of totaling the daily average value of the PPFD values for each of the divided regions divided into 12×8 in the vegetation area 1, it becomes as shown in FIG. 9. In the three dimensional graph in FIG. 9, the daily average value of the PPFD values is shown for each of the divided regions divided into 12×8 in the vegetation area 1.

In this connection, the daily average value of the PPFD values for each of the divided regions shown in the three dimensional graph is one example of a statistic value acquired by processing the PPFD values (PPFD values of the vegetation area 1) accumulated in time series. In the case of performing the management of vegetation, it is preferable that it is an average value of such a predetermined time range (for example, per one day). However, other than the average value, a statistic value such as a median value may be used. Moreover, the three dimensional graph shown in FIG. 9 is one example of a display form for indicating the statistic value of the PPFD values for each of the divided regions of the vegetation area 1. Accordingly, the statistic value of the PPFD values may be made to be shown in the other display form.

With this, even in the case of a wide region like the vegetation area 1 in the stadium, light effective for photosynthesis can be observed for each of predetermined divided regions. Moreover, by totaling such information for a predetermined time range, such as in units of one day, in units of one week, and in units of one month, it becomes possible to accumulate data with regard to sunshine important for growth of vegetation. Namely, in the index calculating device 10, for each of the divided regions of the vegetation area 1, for example, it is possible to total information with regard to the PPFD value of the vegetation in each of the divided regions in units of common time, such as in units of one day or in units of one week.

In the above, the first embodiment has been described. In the first embodiment, on the basis of the measured values obtained by performing sensing by the sensor 102 for a measurement target region (for example, the vegetation area 1 in FIG. 6) and a reference reflection region (for example, the reference area 3 in FIG. 6), the reference index (PPFD value) of the reference reflection region is calculated, and then, by using the reference index (PPFD value) of the reference reflection region, the measurement target region index (PPFD value) of the measurement target region can be calculated.

That is, since the sensor 102 has a plurality of pixels, it is possible to image the measurement target region and the reference reflection region as images (PPFD correspondent images), and then, from the analysis result of such images, it is possible to calculate the measurement target region index of the measurement target region. Therefore, for example, even in the case of a wide range like the vegetation area 1 in the stadium, by imaging and analyzing an image that overlooks the whole vegetation area 1 in the stadium, it becomes possible to calculate the PPFD value of the vegetation area 1. With this, it is possible to cope sufficiently with scenes that require strict managements of vegetation, such as management of lawn in a stadium and management of plants in precision farming.

Moreover, in the shady area 2 overlapping with the vegetation area 1 in the stadium, its state changes greatly correspondingly to time, seasons, weathers, and the like. In the first embodiment, as the reference reflection region (reference area), the reference area 3-1 of a sunny place and the reference area 3-2 of a shady place are used, and, it is possible to calculate the PPFD values (a sunny place reference index and a shady place reference index) corresponding to the sunny place and the shady place in the vegetation area 1. Therefore, it becomes possible to grasp correctly a sunshine situation on a wide region like the vegetation area 1 in the stadium irrespective of the state of the shady area 2.

3. Second Embodiment: In Case of Having Used RGB Filter, PPFD Value is Calculated Using Reference Reflection Region and Look-Up Table (LUT)

(Constitution of Index Calculating Device)

Figure 10:
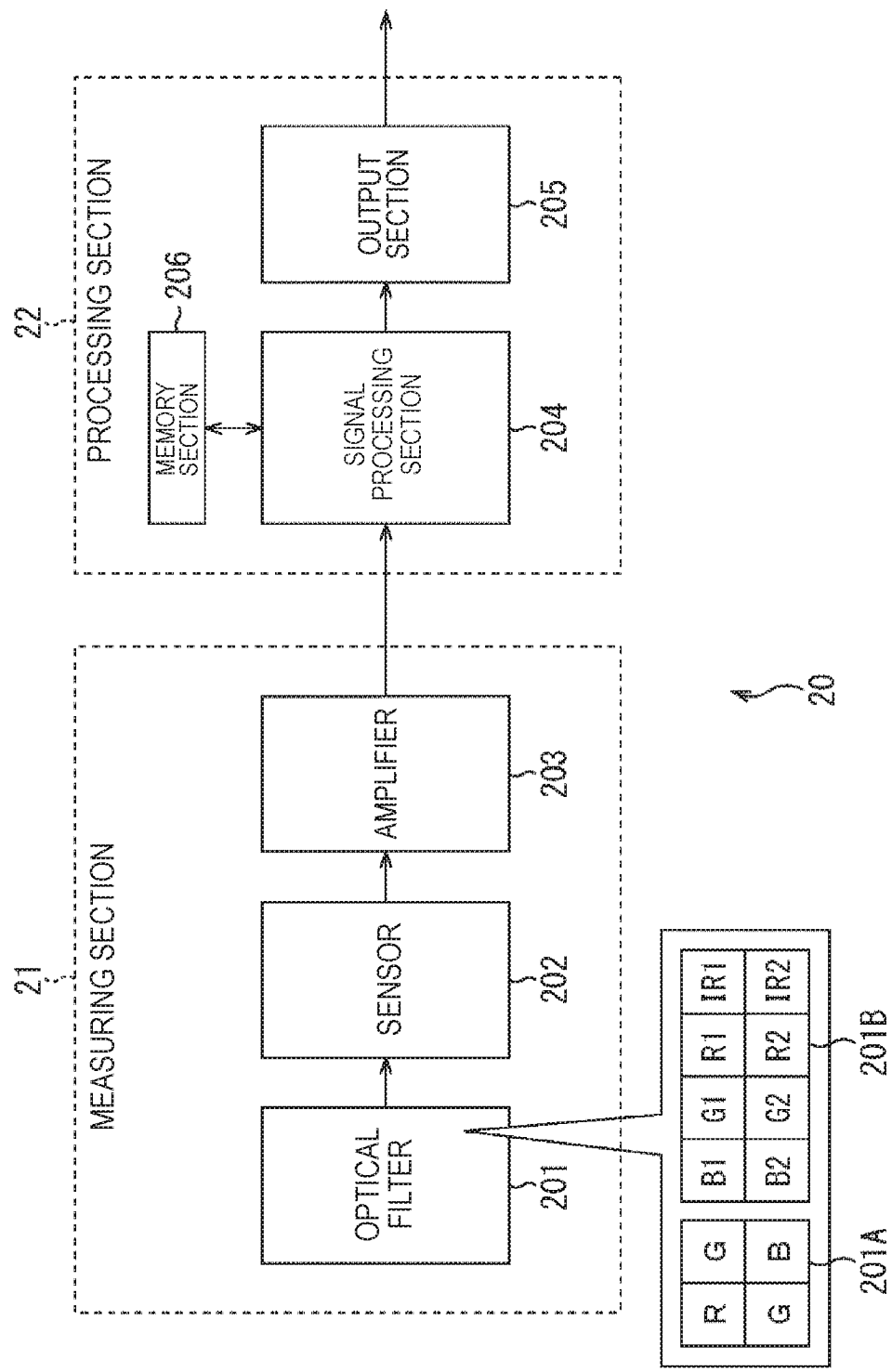
FIG. 10 is a diagram showing a constitution example of an index calculating device in the second embodiment.

FIG. 10 is a diagram showing a constitution of one embodiment (the second embodiment) of the index calculating device to which the present technology is applied.

Similarly to the above-mentioned index calculating device 10 (FIG. 3), the index calculating device 20 is a device for performing sensing for a measurement target region and calculating an index with regard to light entering the measurement target region. In this connection, also in the second embodiment, description is given for a case where as a measurement target region, a region with regard to vegetation is made a target, and as its index (measurement target region index), a PPFD value (photosynthetic photon flux density (PPFD)) is calculated.

In FIG. 10, the index calculating device 20 includes a measuring section 21 that includes an optical filter 201, a sensor 202, and an amplifier 203 and a processing section 22 that includes a signal processing section 204, an output section 205, and a memory section 206.

The optical filter 201 includes, for example, filters, such as an RGB color filter.

The sensor 202 is a sensor that includes, on its sensor surface, a pixel array section in which a plurality of pixels is arranged two-dimensionally. The sensor 202 performs sensing for light having passed through the optical filter 201 with the plurality of pixels arranged two-dimensionally on the pixel array section, thereby outputting measurement signals (measured value) corresponding to an amount of the light to the amplifier 203.

In this connection, the optical filter 201 can be constituted as an on chip filter on the upper portion of the plurality of pixels arranged two-dimensionally on the pixel array section of the sensor 202.

For example, by disposing an IR cut filter and RGB color filters as the optical filter 201, in a pixel array section of the sensor 202, for example, as shown in an arrangement pattern 201A as RGB color filters in FIG. 10, a plurality of pixels can be two-dimensionally arranged with a Bayer arrangement. Here, the Bayer arrangement is an arrangement pattern in which G pixels of green (G) are arranged in a checkered pattern, and at the remaining portions, an R pixel of red (R) and a B pixel of blue (B) are alternately arranged for each column. Moreover, the arrangement pattern of color filters is not limited to the Bayer arrangement shown as the arrangement pattern 201A, and other arrangement patterns may be made to be adopted.

Moreover, for example, by disposing only color filters as the optical filter 201 without disposing an IR cut filter, the pixel array section of the sensor 202 may made, for example, an arrangement pattern as shown in an arrangement pattern 201B in FIG. 10. In the arrangement pattern 201B, besides R, G, and B pixels corresponding to RGB color filters that transmit wave lengths of visible light of red (R), green (G), and blue (B), an IR pixel corresponding to infrared light (IR) is arranged. In this connection, in the present specification, it is assumed that infrared light is one of colors, and the color filters include a filter that transmits the wave lengths of infrared light.

In the arrangement pattern 201B in FIG. 10, for example, four pixels are arranged in the transverse direction and two pixels are arranged in the longitudinal direction so that 4×2 pixels (two R pixels (R1, R2), two G pixels (G1, G2), two B pixels (B1, B2), two IR pixels (IR1, IR2)) are made one set. Then, such eight pixels are made one set, and a plurality of pixels that constitutes n (n is an integer of one or more) sets is arranged repeatedly in a pixel array section. In this connection, the number of pixels per one set is not limited to eight pixels, and, for example, other forms such as a constitution in which four pixels including one R pixel, one G pixel, one B pixel, and one IR pixel, are made one set, may be adopted.

The amplifier 203 amplifies the measurement signals output from the sensor 202, and outputs to the signal processing section 204.

The signal processing section 204 includes circuits, such as a CPU and a FPGA, calculates the PPFD value (measurement target region index) of a measurement target region by performing predetermined signal processing for the measurement signals (measured value) output from the amplifier 203, and supplies the calculated PPFD value to the output section 205.

The detailed contents of the signal processing will be mentioned later. However, in here, by multiplying measured values (RGB signals) obtained by performing sensing for, in addition to a vegetation area becoming a measurement target region, a reference reflection region (a reference area of a sunny place and a shady place) with a known reflectance by a coefficient acquired from a look-up table (LUT) memorized in advance in the memory section 206, the PPFD value of the sunny place (sunny place reference index) and the PPFD value of the shady place (shady place reference index) in the reference area corresponding to the spectral characteristic of sunlight are calculated.

Moreover, in this signal processing, by using the PPFD values (reference indexes) of the sunny place and the shady place in the reference area, it is possible to calculate the PFFD values (measurement target region indexes) including the PPM value of a sunny place (sunny measurement target region index) and the PPFD value of a shady place (shady measurement target region index) in the vegetation area. In this connection, in the reference reflection region, similarly to the above-mentioned first embodiment, there are one in which the characteristic of a spectral reflectance becomes flat and one in which the characteristic of a spectral reflectance does no become flat, and its detailed contents are also mentioned later.

The output section 205 includes an external output interface circuit etc., processes the PPFD values of the measurement target region output from the signal processing section 204, and outputs as numeric data or image data (for example, data of a two-dimensional graph of B in later-mentioned FIG. 8 and a three-dimensional graph in FIG. 9, which have been described above) to an external device such as a display device such as a display and a memory device such as a semiconductor memory. With this, for example, it is possible to make the display device display an image corresponding to the PPFD value of the vegetation area or to make the memory device memorize the numeric data or image data of the PPFD value.

The index calculating device 20 is constituted as mentioned in the above.

(Constitution of Signal Processing Section)

Figure 11:
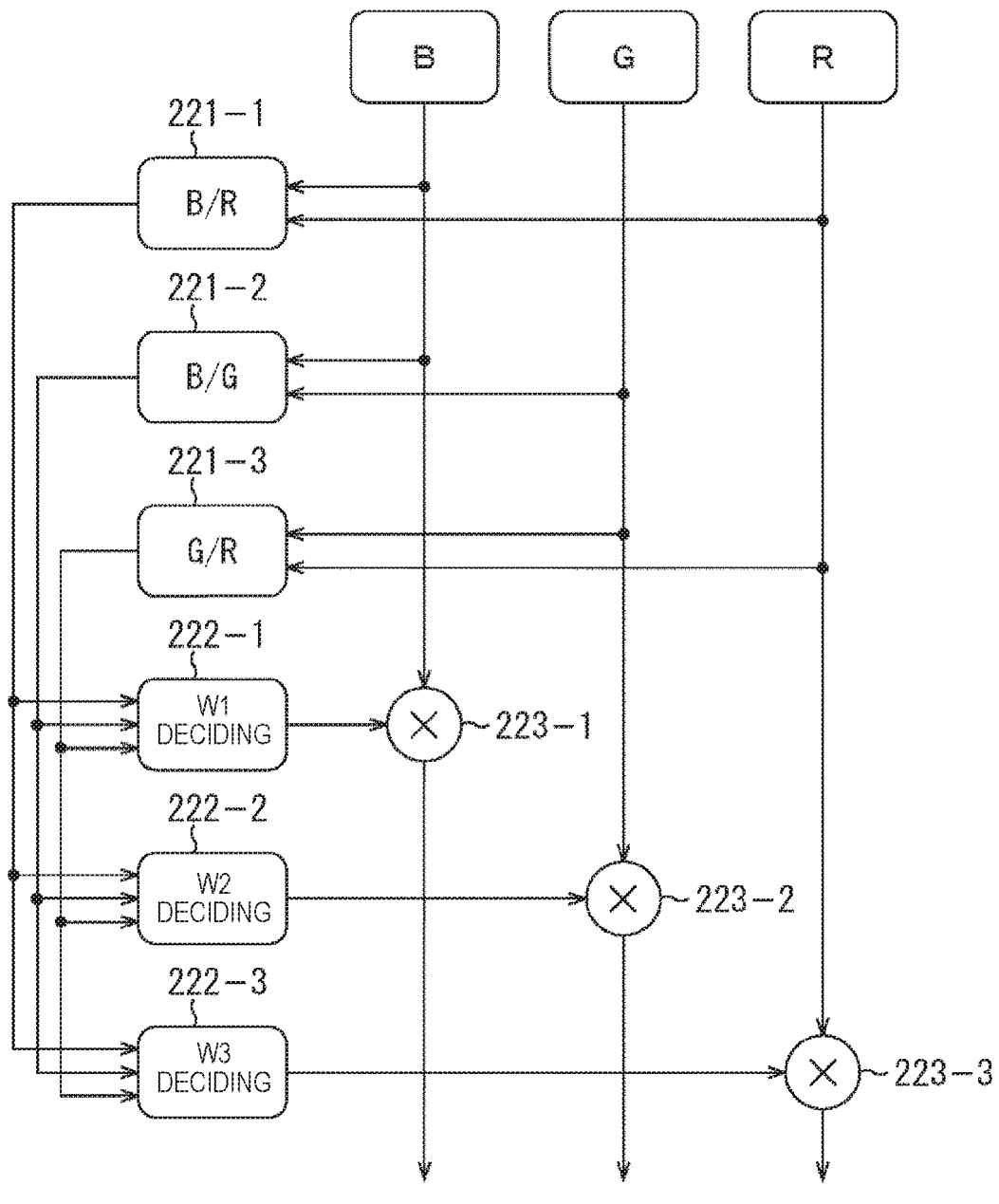
FIG. 11 is a diagram showing a detailed constitution example of a signal processing section in FIG. 10.

FIG. 11 is a diagram showing a detailed constitution example of the signal processing section 204 in FIG. 10. However, in the following description, a case where an IR cut filter and RGB color filters are disposed as the optical filter 201 and a plurality of pixels arranged two-dimensionally in the pixel array section of the sensor 202 is made the arrangement pattern of the arrangement pattern 201A shown in FIG. 10, is described as one example.

In FIG. 11, the signal processing section 204 includes a B/R value calculating section 221-1, a B/G value calculating section 221-2, a G/R value calculating section 221-3, a W1 deciding section 222-1, a W2 deciding section 222-2, a W3 deciding section 222-3, a multiplier 223-1, a multiplier 223-2, and a multiplier 223-3.

In the signal processing section 204, among a B signal, a G signal, and a R signal that are input as measured values from the measuring section 21, the B signal is input to the B/R value calculating section 221-1, the B/G value calculating section 221-2, and the multiplier 223-1. Moreover, the G signal is input to the B/G value calculating section 221-2, the G/R value calculating section 221-3, and the multiplier 223-2, and the R signal is input to the B/R value calculating section 221-1, the G/R value calculating section 221-3, and the multiplier 223-3.

The B/R value calculating section 221-1 divides the B signal input thereto by the R signal, and outputs the B/R value obtained by it to each of the W1 deciding section 222-1 through the W3 deciding section 222-3.

The B/G value calculating section 221-2 divides the B signal input thereto by the G signal, and outputs the B/G value obtained by it to each of the W1 deciding section 222-1 through the W3 deciding section 222-3.

The G/R value calculating section 221-3 divides the G signal input thereto by the R signal, and outputs the G/R value obtained by it to each of the W1 deciding section 222-1 through the W3 deciding section 222-3.

The W1 deciding section 222-1 decides the coefficient W1 corresponding to the B/R value, the B/G value, or the G/R value that is input thereto, and outputs to the multiplier 223-1. The multiplier 223-1 multiplies the B signal input thereto by the coefficient W1 from the W1 deciding section 222-1.

The W2 deciding section 222-2 decides the coefficient W2 corresponding to the B/R value, the B/G value, or the G/R value that is input thereto, and outputs to the multiplier 223-2. The multiplier 223-2 multiplies the G signal input thereto by the coefficient W2 from the W2 deciding section 222-2.

The W3 deciding section 222-3 decides the coefficient W3 corresponding to the B/R value, the B/G value, or the G/R value that is input thereto, and outputs to the multiplier 223-3. The multiplier 223-3 multiplies the R signal input thereto by the coefficient W3 from the W3 deciding section 222-3.

Figure 12:
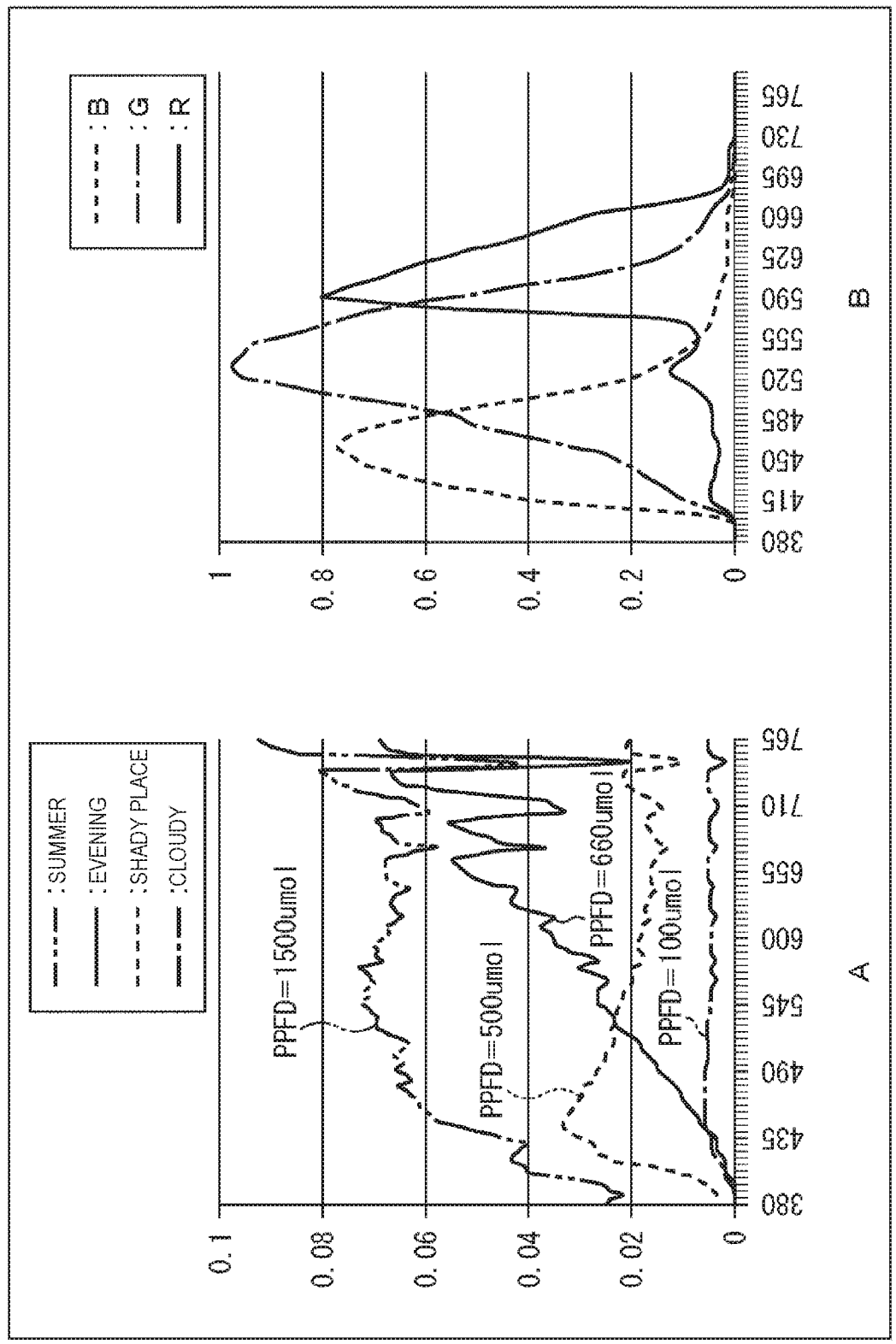
FIG. 12 is a diagram showing a relationship between a PPFD value and a value of each color component of RGB.

Here, the reason why the values of the B signal, the G signal, and the R signal are multiplied by the coefficient W1, the coefficient W2, and the coefficient W3 respectively, is described. The relationship between a PPFD value and values of color components of RGB is shown in FIG. 12. A in FIG. 12 shows the spectral characteristics of sunlight in outdoors in the case where the longitudinal axis represents a spectral radiation luminance (W/sr·m²/nm) and the transverse axis represents wavelength (nm). Moreover, B in FIG. 12 shows RGB signals output from a sensor equipped with color filters of the arrangement pattern 201A in FIG. 10 in the case where the longitudinal axis represents the signal levels of RGB signals and the transverse axis represents wavelength (nm).

In A in FIG. 12, as the spectral characteristic of sunlight corresponding to conditions, such as time, seasons, weathers, and the like, the spectral characteristic of each of sunlight in summer, sunlight in evening, sunlight in a shady place, and sunlight in cloudy is shown. At this time, a PPFD value can be obtained as an integration value of values obtained by multiplying the level of sunlight in each wavelength by each wavelength. That is, the PPFD value is calculated by the following equation (2).

[Math. 1]

$$PPFD = C1 \times \Sigma_{\lambda=400\ nm}^{700\ nm}(A \times \lambda(nm)) \quad (2)$$

In this connection, in the equation (2), A represents a spectral radiation luminance (W/sr·m²/nm), and λ (nm) represents wavelength. Moreover, λ=400 nm to 700 nm corresponds to the absorption wavelength of chlorophyll of photosynthetic photon flux density (PPFD). Furthermore, C1 is a coefficient.

In A in FIG. 12, 1500 umol as the PPFD value of sunlight in summer, 660 umol as the PPFD value of sunlight in evening, 500 umol as the PPFD value of sunlight in a shady place, and 100 umol as the PPFD value of sunlight in cloudy weather are calculated, respectively. In this way, the spectral characteristic of sunlight, in concrete terms, the PPFD value becomes different greatly depending on the slope in a graph in the case where the transverse axis represents wavelength, the longitudinal axis represents spectral radiation luminance, and the spectral radiation luminance is normalized to a range of 0 to 1.

Here, as shown in B in FIG. 12, in the arrangement pattern 201A in FIG. 10, for incident light, values obtained by integrating signals of wavelength zones corresponding to respective B, G, R pixels are output from the sensor. Moreover, in order to obtain PPFD values from RGB signals, a coefficient W1, a coefficient W2, and a coefficient W3 may be controlled so as to obtain results equivalent to values to be acquired as the PPFD values by multiplying respective values of the B signal, the G signal, and the R signal by respective coefficient W1, coefficient W2, and coefficient W3.

Moreover, in the index calculating device 20, since the optical filter 201 includes an IR cut filter and RGB color filters, the output from the sensor 202 becomes RGB signals. Therefore, also in the index calculating device 20, a coefficient W1, a coefficient W2, and a coefficient W3 may be controlled so as to obtain results equivalent to values to be acquired as the PPFD values by multiplying respective values of the B signal, the G signal, and the R signal by respective coefficient W1, coefficient W2, and coefficient W3. That is, in the index calculating device 20, it can be said that the coefficient W1, re coefficient W2, and the coefficient W3 may be controlled so as to satisfy the relation of the following equation (3).

[Math. 2]

$$PPFD = C2 \times (W1 \times B + W2 \times G + W3 \times R) \quad (3)$$

In this connection, in the equation (3), B, G, and R represent values of a B signal, a G signal, and an R signal, respectively, and W1, W2, and W3 represent a coefficient W1, a coefficient W2, and a coefficient W3, respectively. Moreover, C2 is a coefficient.

Here, in the signal processing section 204 in FIG. 11, the W1 deciding section 222-1 decides the coefficient W1 corresponding to the B/R value, the B/G value, or the G/R value. Similarly, the W2 deciding section 222-2 decides the coefficient W2 corresponding to the B/R value, the B/G value, or the G/R value, and the W3 deciding section 222-3 decides the coefficient W3 corresponding to the B/R value, the B/G value, or the G/R value.

Namely, in the W1 deciding section 222-1 through the W3 deciding section 222-3, by calculating a ratio of a B signal and an R signal, a ratio of a B signal and a. G signal, or a ratio of a G signal and an R signal from the respective values of the B signal, the G signal, and the R signal obtained from the sensor 202, the slope (a value corresponding to the slope) of the spectral characteristic of sunlight can be obtained from the value (the B/R value, the B/G value, or the G/R value) of the ratio.

Then, in the processing section 22 of the index calculating device 20, a look-up table (LUT) in which the slope of the spectral characteristic of sunlight (slope of the spectral characteristic obtained from the B/R value, the B/G value, or the G/R value) and the coefficient W1, the coefficient W2, and the coefficient W3 are associated with each other, is memorized in the memory section 206. With this, in the W1 deciding section through the W3 deciding section 222-3, the coefficient W1 through the coefficient W3 corresponding to the slope of the spectral characteristic obtained from the B/R value, the B/G value, or the G/R value can be decided from the look-up table.

That is, in the W1 deciding section 222-1, by referring to the look-up table, the coefficient W1 corresponding to the slope of the spectral characteristic obtained from the B/R value etc. is decided. As a result, in the multiplier 223-1, the B signal is multiplied by the coefficient W1 decided by the W1 deciding section 222-1, thereby obtaining the PPFD value (W1×B) of the B signal.

In addition, in the W2 deciding section 222-2, by referring to the look-up table, the coefficient W2 corresponding to the slope of the spectral characteristic obtained from the B/R value etc. is decided. As a result, in the multiplier 223-2, the G signal is multiplied by the coefficient W2 decided by the W2 deciding section 222-2, thereby obtaining the PPFD value (W2×G) of the G signal.

In addition, in the W3 deciding section 222-3, by referring to the look-up table, the coefficient W3 corresponding to the slope of the spectral characteristic obtained from the B/R value etc. is decided. As a result, in the multiplier 223-3, the R signal is multiplied by the coefficient W3 decided by the W3 deciding section 222-3, thereby obtaining the PPFD value (W3×R) of the R signal.

Moreover, in the signal processing section 204, in accordance with the above-mentioned equation (3), the output (W1×B) from the multiplier 223-1, the output (W2×G) from the multiplier 223-2, and the output (W3×R) from the multiplier 223-3 are added, whereby a PPFD value (W1×B+W2×G+W3×R) is calculated.

(PPFD Value Calculating Process)

Figure 13:
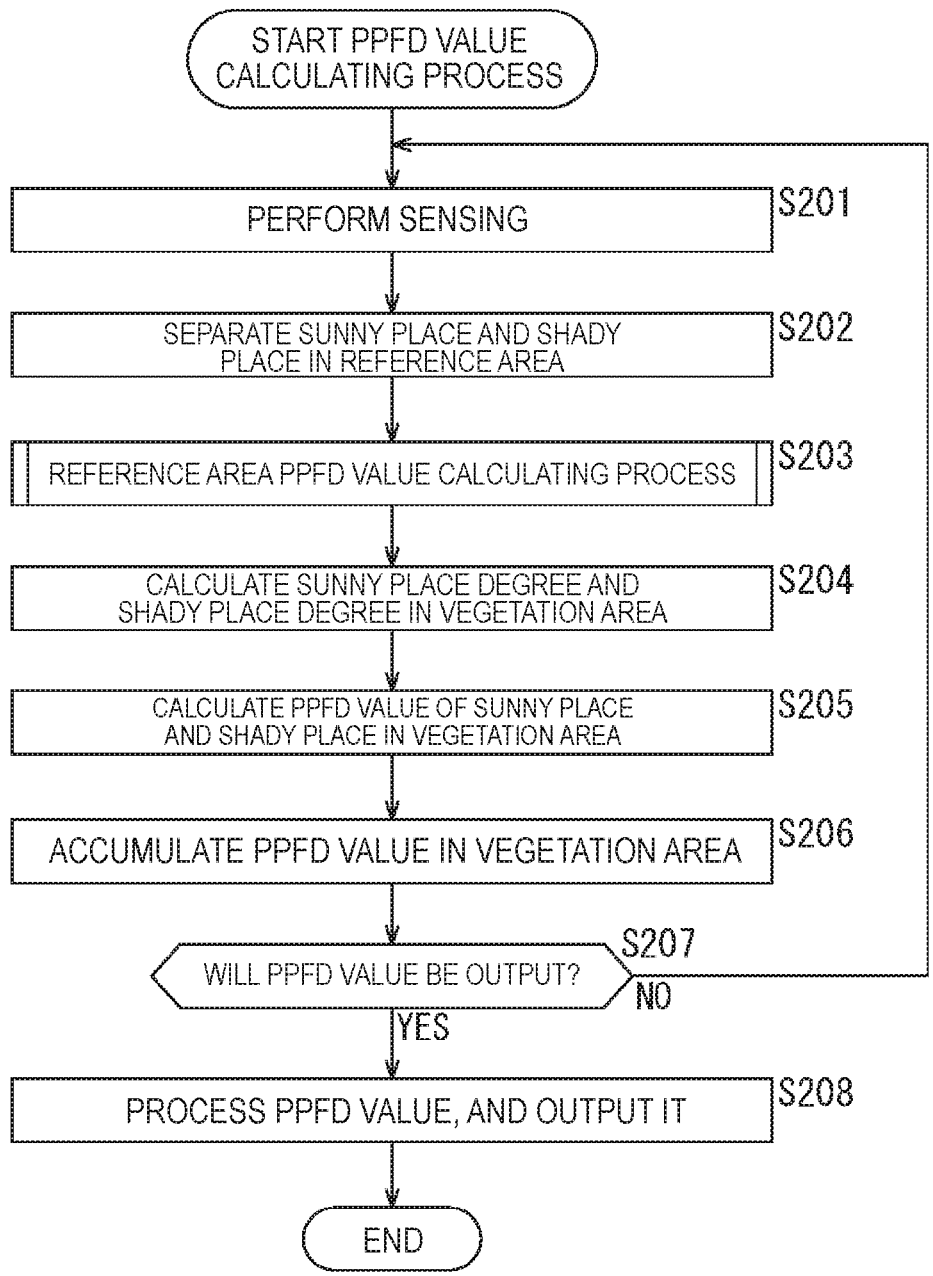
FIG. 13 is a flowchart for describing a flow of a PPFD value calculating process in the second embodiment.

Next, with reference to a flowchart in FIG. 13, a flow of a PPFD value calculating process in the second embodiment executed by the index calculating device 20 in FIG. 10 is described.

In this connection, as compared with the PFFD value calculating process (FIG. 4) in the above-mentioned first embodiment, the PPFD value calculating process (FIG. 13) in the second embodiment is different in the process to calculate the PPFD values of a sunny place and a shady place in a reference area. However, in processes other than it, basically, the similar processes are performed. That is, in the case of comparing the processes in the flowchart in FIG. 13 with the processes in the flowchart in FIG. 4, in the process in Step S203 in FIG. 13 and in the process in Step S103 in FIG. 4, the contents of the processes are different. However, in Steps S201, S202, S204 through S208 in FIG. 13 and in Steps S101, S102, S104 through S108 in FIG. 4, the similar processes are performed.

Figure 14:
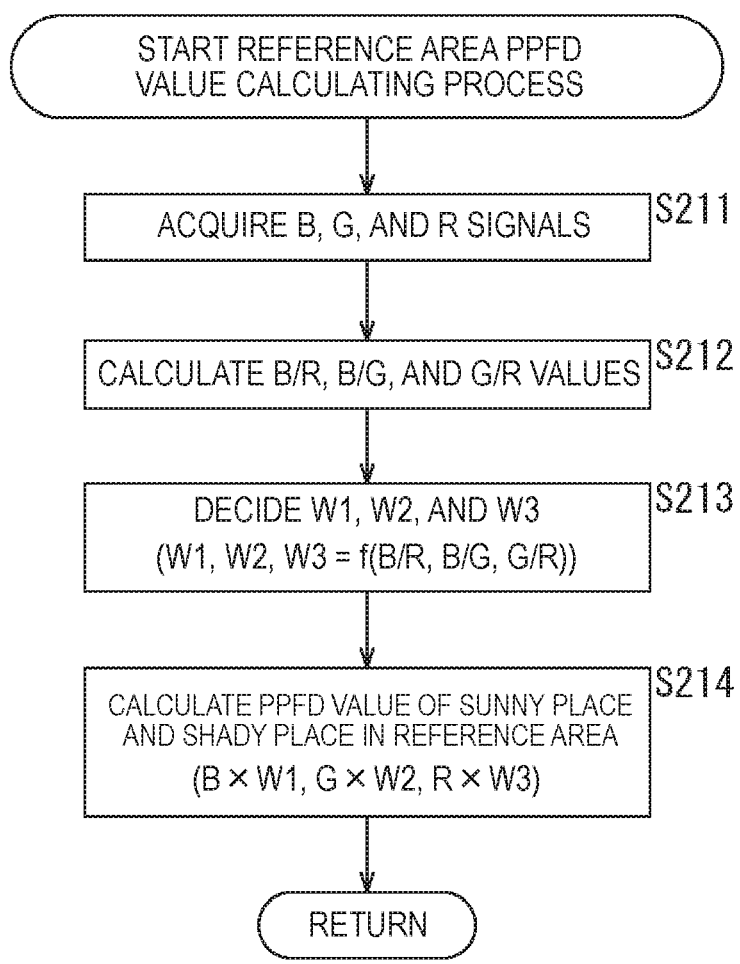
FIG. 14 is a flowchart for describing a flow of a reference area PPFD value calculating process.

Therefore, in the following description, the process in Step S203 for calculating the PPFD values of a sunny place and a shady place in a reference area will be mainly described. Here, FIG. 14 is a flowchart for describing the details of a reference area PPFD value calculating process corresponding to Step S203 in FIG. 13.

In Step S211, the signal processing section 204 acquires the value of each of a B signal, a G signal, and an R signal of RGB correspondent images corresponding to measured values from the sensor 202.

In this connection, the RGB correspondent images processed in Step S211 are images corresponding to RGB signals obtained from light having passed through the optical filter 201 that is disposed at the former stage of the sensor 202 and makes incident light pass through an IR cut filter and RGB color filters in this order.

In Step S212, the signal processing section 204 calculates a B/R value, a B/G value, or a G/R value on the basis of the value of each of the B signal, the G signal, and the R signal acquired in the process in Step S211.

In more concrete terms, in the B/R value calculating section 221-1, a B/R value is calculated from the B signal and the R signal. Moreover, in the B/G value calculating section 221-2, a B/G value is calculated from the B signal and the G signal. Furthermore, in the (l/R value calculating section 221-3, a G/R value is calculated from the G signal and the R signal.

In Step S213, by referring to the look-up table memorized by the memory section 206, the signal processing section 204 decides the coefficient W1, the coefficient W2, and the coefficient W3 corresponding to the B/R value, the B/G value, or the G/R value calculated in the process in Step S212.

In more concrete terms, in the W1 deciding section 222-1, the slope of the spectral characteristic of sunlight corresponding to the B/R value, the B/G value, or the G/R value is obtained, and the coefficient W1 corresponding to the slope of the spectral characteristic is decided from the look-up table. Similarly, in the W2 deciding section 222-2 and the W3 deciding section 222-3, the slopes of the spectral characteristics of sunlight corresponding to the B/R value etc. are obtained, and the coefficient W2 and the coefficient W3 corresponding to these slopes of the spectral characteristic are decided from the look-up table.

In Step S214, the signal processing section 204 calculates the PPFD value of the reference area by multiplying the respective values of the B signal, the G and the R signal acquired in the process in Step S211 by the respective coefficient W1, coefficient W2, and coefficient W3 decided by the process in Step S213.

In more concrete terms, in the multiplier 2234, the B signal is multiplied by the coefficient W1. Moreover, in the multiplier 223-2, the G signal is multiplied by the coefficient W2. Furthermore, in the multiplier 223-3, the R signal is multiplied by the coefficient W3. Then, in the signal processing section 204, the output (W1×B) from the multiplier 223-1, the output (W2×G) from the multiplier 223-2, and the output (W3×R) from the multiplier 223-3 are added, and the PPFD value (W×B+W2×G+W3×R) of the reference area is obtained.

However, in here, since the sunny region and the shady region in the reference area are separated in the process in Step S202 in FIG. 13, the processes in Steps S211 through S214 are performed for each of the sunny region and the shady region. As a result, each of the PPFD value of the sunny region in the reference area and the PPFD value of the shady region in the reference area is calculated separately.

Upon ending of the process in Step S214, the process returns to Step S203 in FIG. 13, and processes on and after that are performed.

That is, in Step S204, a sunny place degree and a shady place degree in the vegetation area are calculated. Then, in Step S205, the above-mentioned equation (1) is applied to the PPFD values of the sunny region and the shady region in the reference area calculated in the process in Step S203 and the sunny place degree and the shady place degree in the vegetation area calculated in the process in Step S204, whereby the PPFD values of the sunny place and the shady place in the vegetation area are calculated.

In Step S206, the signal processing section 204 or the output section 205 accumulates the PPFD values of the vegetation area calculated in the process in Step S205.

In Step S207, it is determined whether to output the PPFD values accumulated in the process in Step S206.

In Step S207, in the case where it has been determined not to output the PPFD values, the process returns to Step S201, and the processes of Steps S201 through S207 are repeated. With this, in the index calculating device 20, the PPFD values of the vegetation area 1 where a sunshine situation changes greatly under the influence of the shady area 2 in which its state changes greatly correspondingly to time, seasons, weathers, etc., are accumulated in time series.

Then, in Step S207, in the case where it has been determined to output the PPFD values, the process is made to proceed to Step S208. In Step S208, the output section 205 processes (total) the PPFD values of the vegetation area accumulated in the process in Step S206, and outputs.

In the above, the flow of the PPFD value calculating process in the second embodiment has been described. Here, with reference to FIG. 15 through FIG. 20, the PPFD value calculating process (FIG. 13) in the second embodiment is described more concretely. However, a look-up table used in the second embodiment is different in its contents between a case where a reference area such as a gray reflection plate in which spectral reflectance characteristic becomes flat is used as a reference area and a case where a reference area such as en-tout-cas in which spectral reflectance characteristic is not flat is used.

Then, in the following description, first, with reference to FIG. 15 through FIG. 17, description is given for an example of calculation of a PPFD value in the case of having used a gray reflection plate being a reference area in which spectral reflection characteristic is flat, and thereafter, with reference to FIG. 18 through FIG. 20, description is given for an example of calculation of a PPFD value in the case of having used en-tout-cas being a reference area in which spectral reflection characteristic is not flat in this connection, the PPFD value described here is one corresponding to the PPFD value of the reference area calculated in the process in Step S203 in FIG. 13.

(Example of Calculation of PPFD Value in Case of Having Used Gray Reflection Plate)

Figure 15:
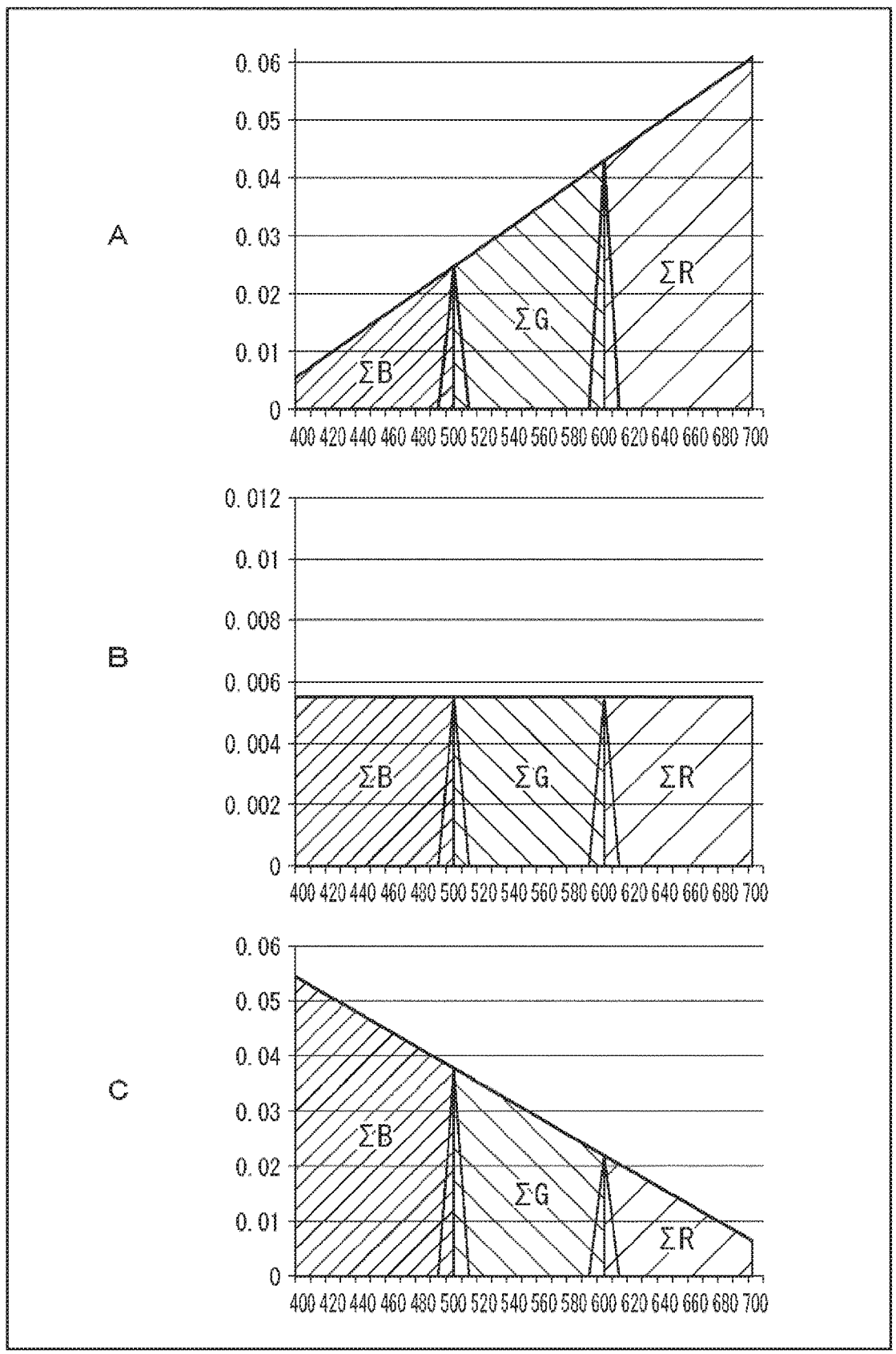
FIG. 15 is a diagram showing an example of spectral characteristic of sunlight in the case of having used a gray reflection plate.
Figure 16:
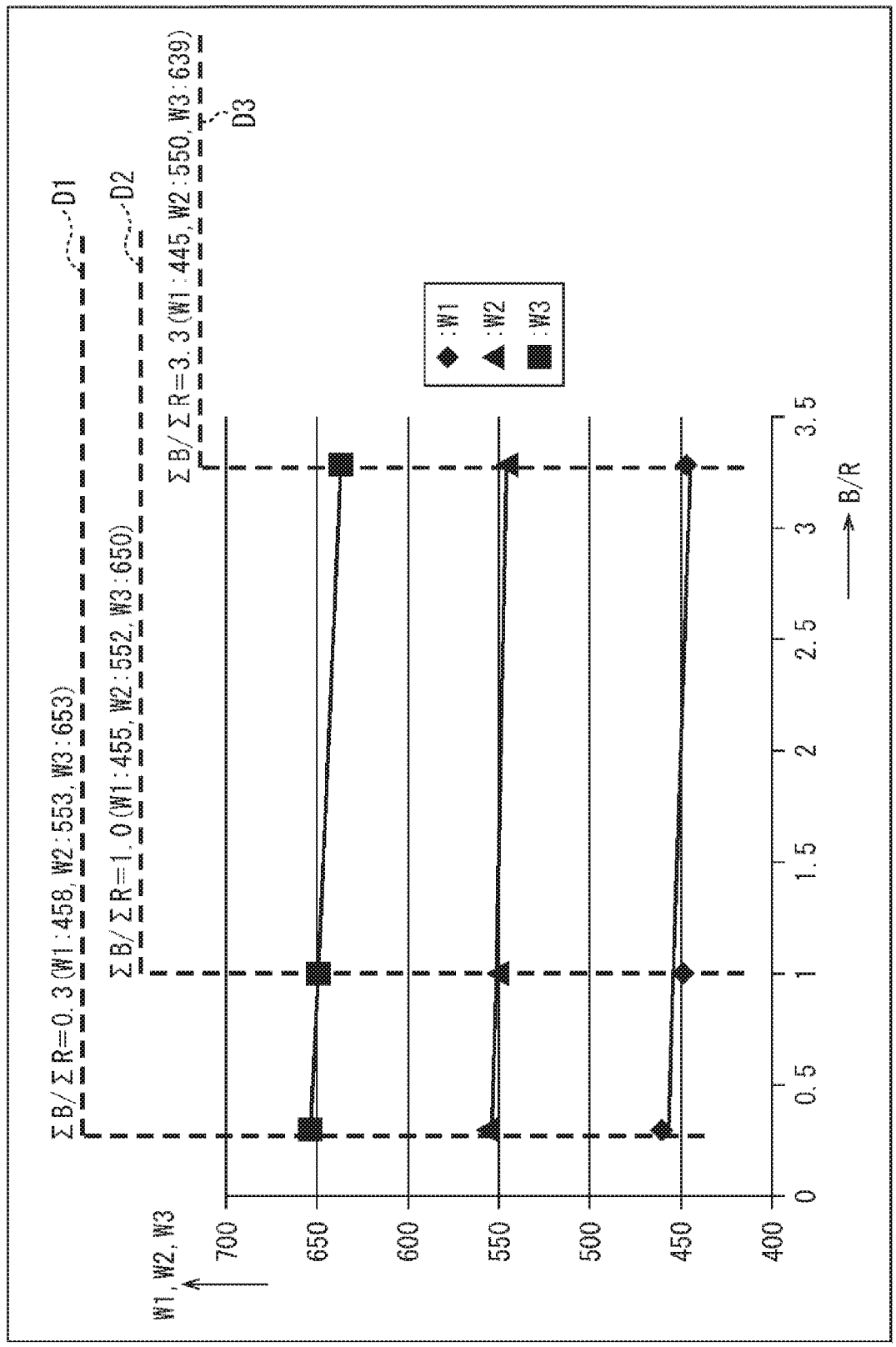
FIG. 16 is a diagram showing an example of a look-up table (LUT) in the case of having used a gray reflection plate.
Figure 17:
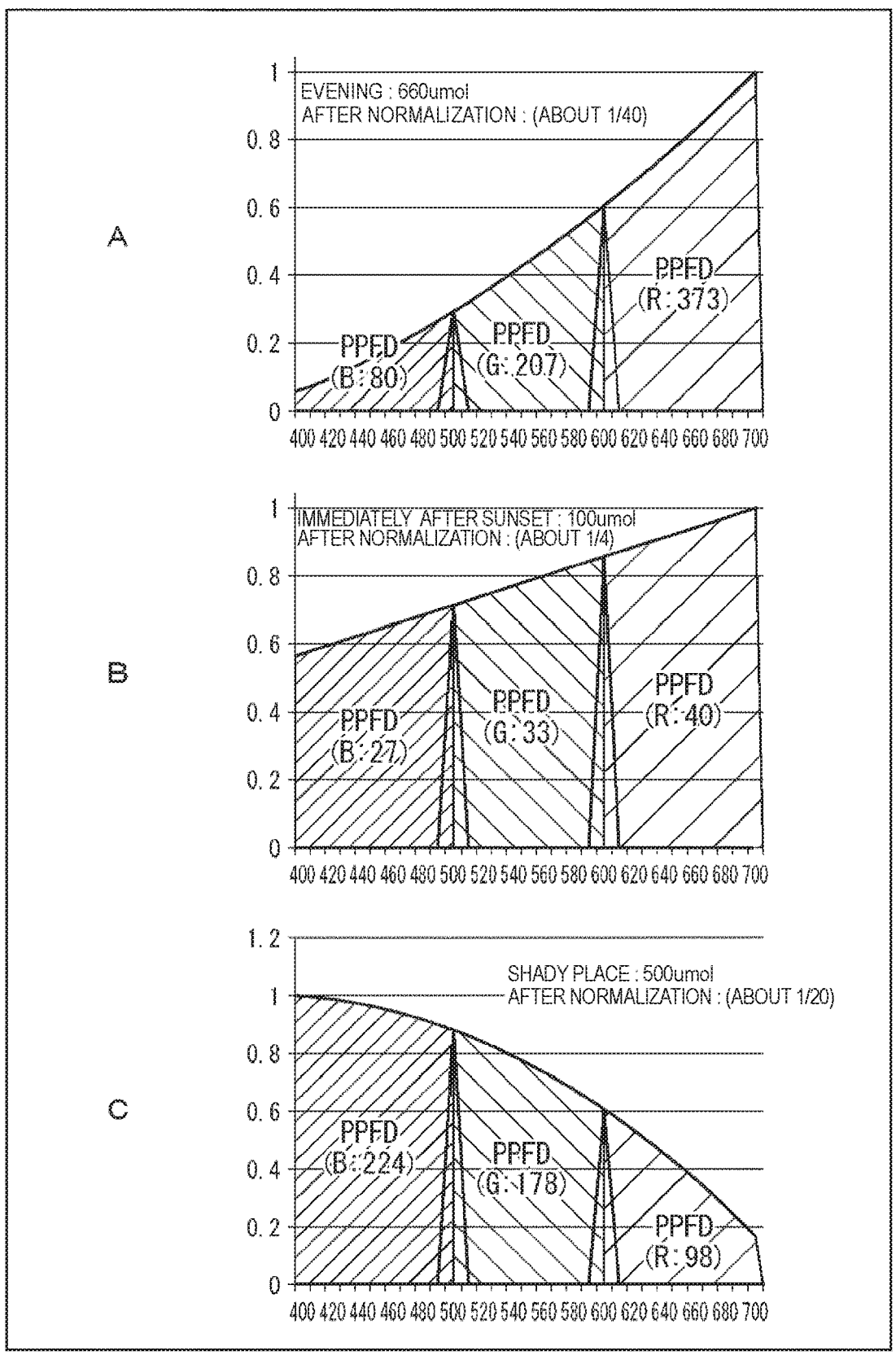
FIG. 17 is a diagram showing an example of a PPFD value for each sunlight in the case of having used a gray reflection plate.

First, with reference to FIG. 15 through FIG. 17, an example of calculation of a PPFD value in the case of having used a gray reflection plate as reference area, is described. FIG. 15 shows an example of the spectral characteristic of sunlight when a gray reflection plate has been used, in the case where the longitudinal axis represents a spectral radiation luminance (W/sr·m$^2$/nm) and a transverse axis represents wavelength (nm). The spectral characteristic in A in FIG. 15 is formed by a straight line inclining upward to the right, and tends to appear at a sunny place in the evening. Moreover, the spectral characteristic in B in FIG. 15 is formed by an almost constant value, and tends to appear on the spectral characteristic after sunset. Furthermore, the spectral characteristic in C in FIG. 15 is formed by a straight line inclining downward to the right, and tends to appear on the spectral characteristic at a shady place. In this way, in the case of having used the gray reflection plate, as shown in the above-mentioned A in FIG. 5, since its spectral reflection characteristic becomes flat, the spectral characteristic of sunlight is expressed with a straight line.

FIG. 16 shows an example of a look-up table in the case of having used a gray reflection plate. In FIG. 16, the transverse axis represents the slope of the spectral characteristic of sunlight obtained from a B/R value, and the longitudinal axis represents the values of the coefficient W1, the coefficient W2, and the coefficient W3. That is, in the look-up table, the value (B/R value) obtained as the slope of the spectral characteristic of sunlight is associated with the coefficient W1, the coefficient W2 and the coefficient W3.

Here, it is assumed that, for example, in the case of sunlight of the spectral characteristic at a sunny place in the evening in A in FIG. 15, in the index calculating device 20, sensing is performed by the measuring section 21, and the B/R value of about 0.3 is calculated by the signal processing section 204. At this time, by referring to the look-up table in FIG. 16, the signal processing section 204 (its W1 deciding section 222-1 through W3 deciding section 222-3) decides, as a coefficient corresponding to the B/R value being about 0.3, the coefficient W1 being 458, the coefficient W2 being 553, and the coefficient W3 being 653 (a dotted line D1 in the diagram).

In the signal processing section 204 (its multiplier 223-1 through the multiplier 223-3), the B signal is multiplied by the coefficient W1 being 458, the G signal is multiplied by the coefficient W2 being 553, and the R signal is multiplied by the coefficient W3 being 653. As a result, as shown in A in FIG. 17, 80 umol is calculated as the PPFD value (W1×B) of the B signal, 207 μmol is calculated as the PPFD value (W2×G) of the G signal, and 373 umol is calculated as the PPFD value (W3×R) of the R signal. Then, by adding these PPFD values (W1×B, W2×G, W3×R), 660 umol is calculated as the PPFD value of the sunny place in the evening.

In addition, it is assumed that, in the case of sunlight of the spectral characteristic after sunset in B in FIG. 15, in the index calculating device 20, sensing is performed by the measuring section 21, and the B/R value of about 1.0 is calculated by the signal processing section 204. At this time, by referring to the look-up table in FIG. 16, the signal processing section 204 decides, as a coefficient corresponding to the B/R value being about 1.0, the coefficient W1 being 455, the coefficient W2 being 552, and the coefficient W3 being 650 (a dotted line D2 in the diagram).

In the index calculating device 20, the B signal is multiplied by the coefficient W1 being 455, the G signal is multiplied by the coefficient W2 being 552, and the R signal is multiplied by the coefficient W3 being 650. As a result, as shown in B in FIG. 17, 27 umol is calculated as the PPFD value (W1×B) of the B signal, 33 umol is calculated as the PPFD value (W2×G) of the G signal, and 40 umol is calculated as the PPFD value (W3×R) of the R signal. Then, by adding these PPFD values (W1×B, W2×G, W3×R), 100 umol is calculated as the PPFD value after sunset.

In addition, it is assumed that, in the case of sunlight of the spectral characteristic at a shady place in C in FIG. 15, in the index calculating device 20, sensing is performed by the measuring section 21, and the B/R value of about 3.3 is calculated by the signal processing section 204. At this time, by referring to the look-up table in FIG. 16, the signal processing section 204 decides, as a coefficient corresponding to the B/R value being about 3.3, the coefficient W1 being 445, the coefficient W2 being 550, and the coefficient W3 being 639 (a dotted line D3 in the diagram).

In the index calculating device 20, the B signal is multiplied by the coefficient W1 being 445, the G signal is multiplied by the coefficient W2 being 550, and the R signal is multiplied by the coefficient W3 being 639. As a result, as shown in C in FIG. 17, 224 umol is calculated as the PPFD value (W1×B) of the B signal, 178 umol is calculated as the PPFD value (W2×G) of the G signal, and 98 umol is calculated as the PPFD value (W3×R) of the R signal. Then, by adding these PPFD values (W1×B, W2×G, W3×R), 500 umol is calculated as the PPFD value after sunset.

In this way, in the case of having used a gray reflection plate as a reference area, and in the case where sunlight has the spectral characteristic shown in FIG. 15, in the signal processing section 204 of the index calculating device 20, by referring to the look-up table in FIG. 16, the coefficient W1, the coefficient W2, and the coefficient W3 corresponding to the B/R value (the slope of the spectral characteristic of sunlight obtained from the B/R value) obtained from the measured values of the measuring section 21 are decided (S212, S213 in FIG. 14).

Moreover, in the signal processing section 204, by multiplying the respective values of the B signal, the G signal, and the R signal by the respective coefficients, it is possible to calculate the PPFD value of the reference area (gray reflection plate) shown in FIG. 17 (S214 in FIG. 14). In this case, within the measuring section 21, while measurement signals (measured values) are acquired in the form where the signals of the wavelength band region for the pixels of each of B, G, and R, are integrated, the PPFD values calculated within the processing section 22 also become the PPFD values integrated in the respective wavelength band regions.

Moreover, in the case of having used the gray reflection plate as a reference area, the slope of the spectral characteristic for each sunlight shown in FIG. 15 and the PPFD value of the B signal, the G signal, and the R signal for each sunlight shown in FIG. 17 becomes values (known values) that can be obtained beforehand. Therefore, by obtaining the coefficient W1, the coefficient W2, and the coefficient W3 on the basis of those known values, it becomes possible to create a look-up table in FIG. 16 in the case of having used the gray reflection plate and to memorize beforehand in the memory section 206 in the index calculating device 20.

In this connection, although, in the example in FIG. 15 through FIG. 17, in order to obtain the slope of the spectral characteristic of sunlight, the B/R value has been used, a B/G value, or a G/R value may be used, and at least one value of a B/R value, a B/G value, and a G/R value may be used. Moreover, the PPFD values in A in FIG. 17 through C in FIG. 17 are normalized so as to make it easy to compare the respective PPFD values. Accordingly, in A in FIG. 17, it is adjusted to about 1/40 by the normalization, in B in FIG. 17, it is adjusted to about 1/4 by the normalization, and in C in FIG. 17, it is adjusted to about 1/20 by the normalization.

(Example of Calculation of PPFD Value in Case of Having Used En-Tout-Cas)

Figure 18:
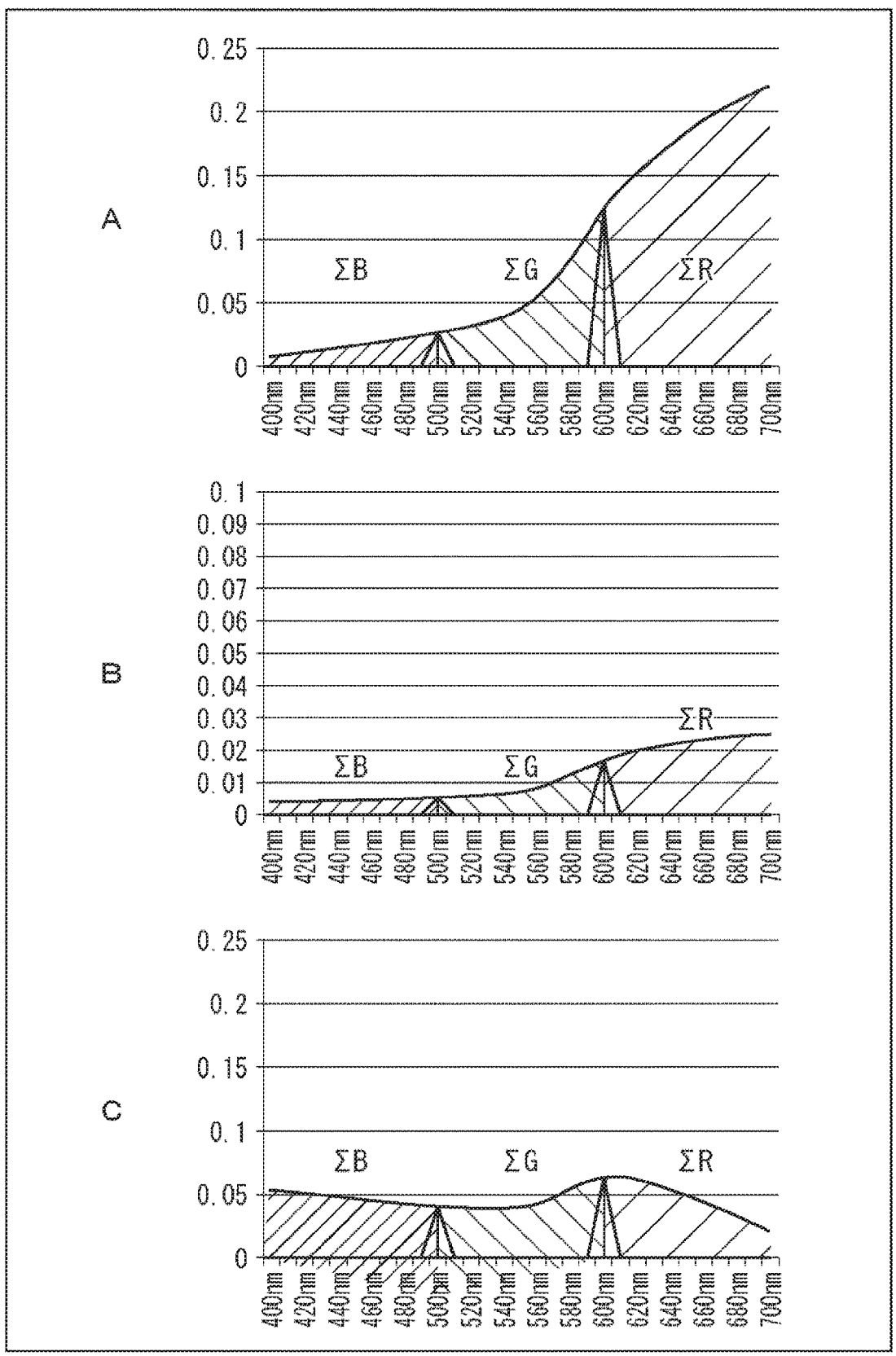
FIG. 18 is a diagram showing an example of spectral characteristic of sunlight in the case of having used en-tout-cas.
Figure 19:
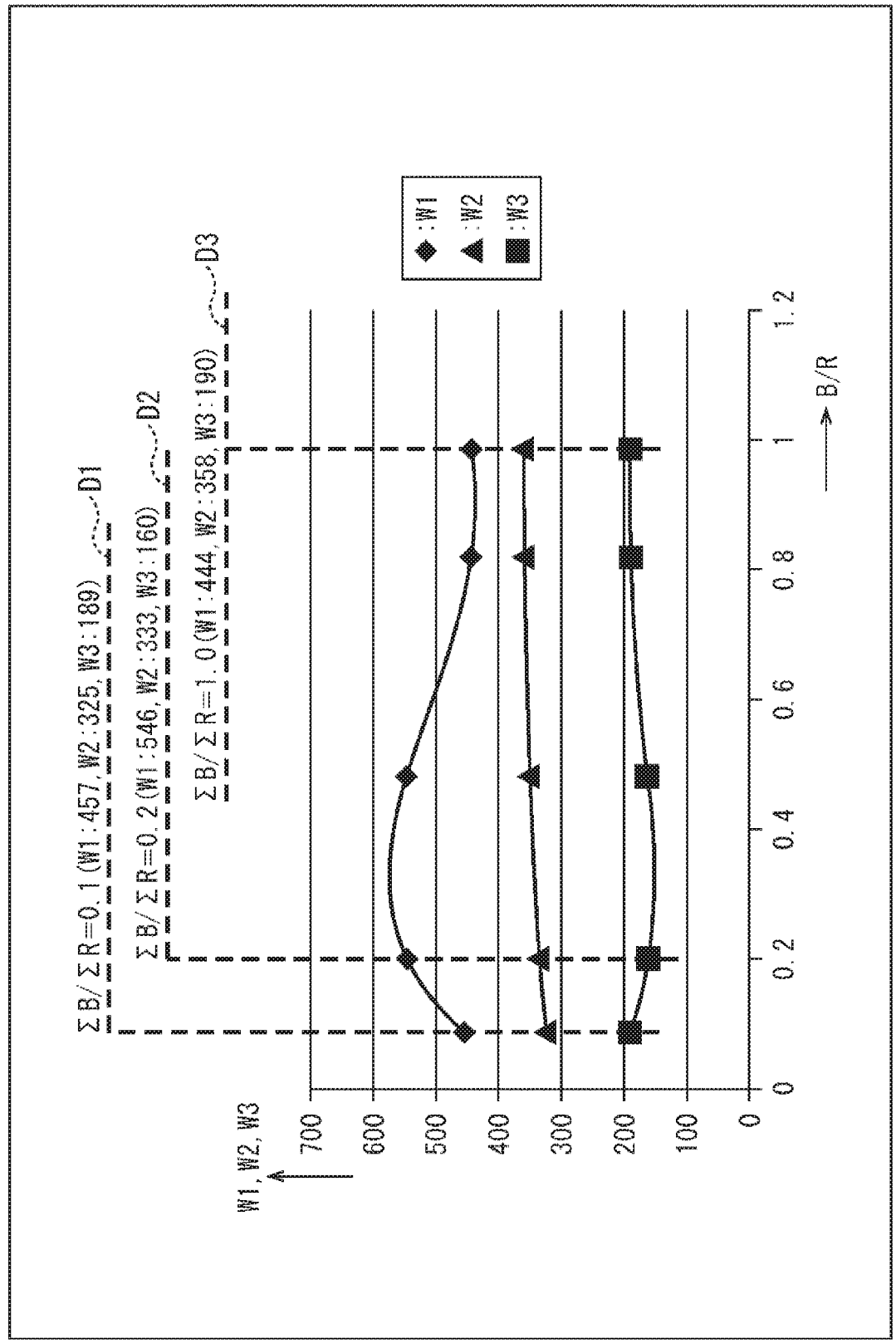
FIG. 19 is a diagram showing an example of a look-up table (LUT) in the case of having used en-tout-cas.
Figure 20:
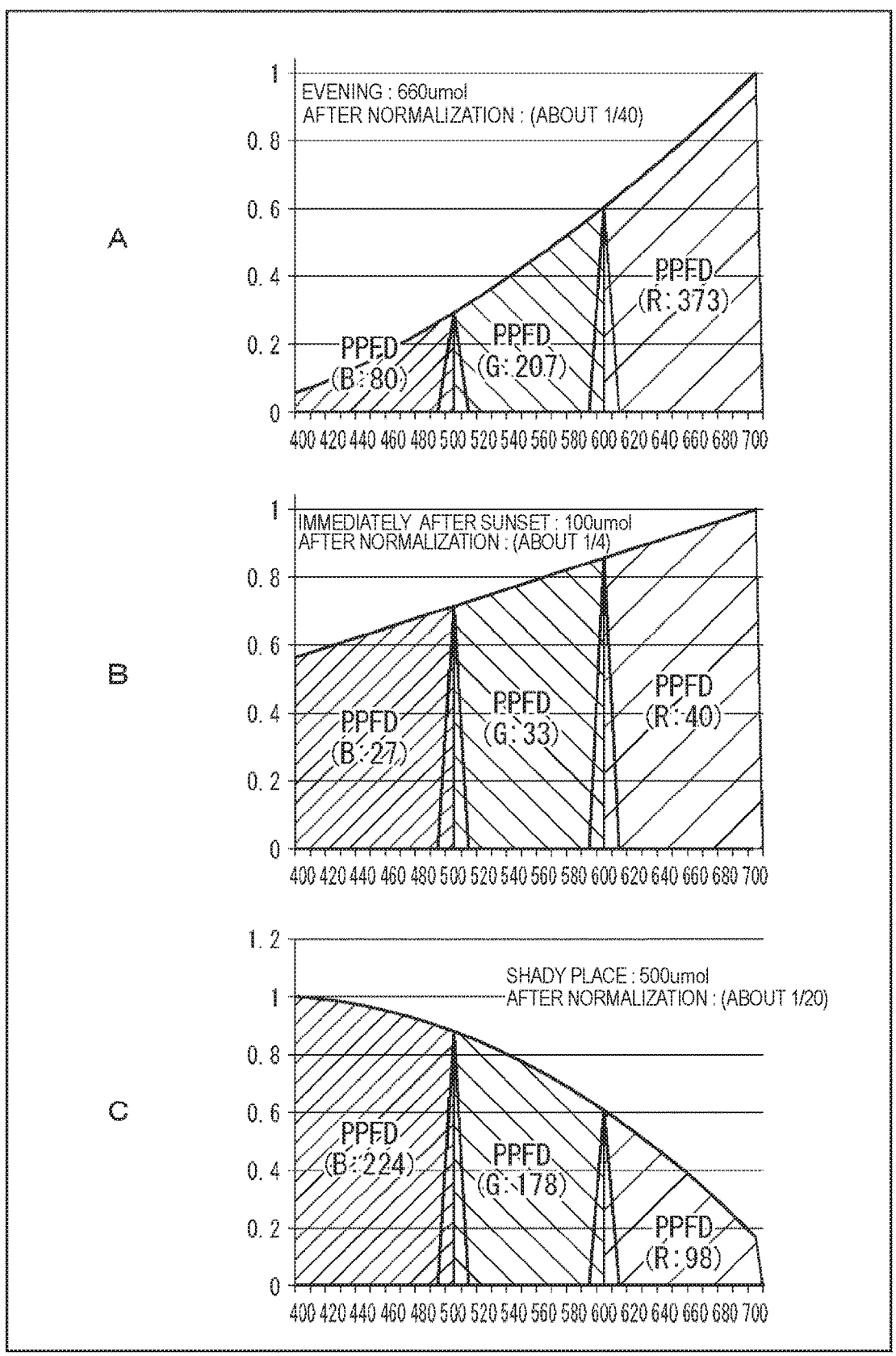
FIG. 20 is a diagram showing an example of a PPFD value for each sunlight in the case of having used en-tout-cas.

Next, with reference to FIG. 18 through FIG. 20, an example of calculation of the PPFD value in the case of having used en-tout-cas as a reference area is described. As shown in the above-mentioned B in FIG. 5, since the spectral reflection characteristic of the en-tout-cas does not become flat, the output of the measuring section 21 of the index calculating device 20 becomes one having been influenced by the reflectance of the en-tout-cas.

Therefore, although, in the above-mentioned A in FIG. 15 through C in FIG. 15, the spectral characteristic of sunlight in the case of having used the gray reflection plate in which the spectral reflection characteristic becomes flat, is shown, in the case of having used the en-tout-cas, such linear spectral characteristic changes to nonlinear spectral characteristic as shown in A in FIG. 18 through C in FIG. 18 by receiving the influence of the reflected light. That is, A in FIG. 18 shows the spectral characteristic that tends to appear at a sunny place in the evening. Moreover, B in FIG. 18 shows the spectral characteristic that tends to appear after sunset, and C in FIG. 18 shows the spectral characteristic that tends to appear in a shady place. In this connection, also in FIG. 18, similarly to FIG. 15, the longitudinal axis represents a spectral radiation luminance (W/sr·m$^2$/nm) and the transverse axis represents wavelength (nm).

FIG. 19 shows an example of a look-up table in the case of having used the en-tout-cas. In the look-up table shown in FIG. 19, similarly to FIG. 16, the value (B/R value) obtained as a slope of the spectral characteristic of sunlight is associated with the coefficient W1, the coefficient W2 and the coefficient W3.

Here, it is assumed that, for example, in the case of sunlight of the spectral characteristic at a sunny place in the evening in A in FIG. 18, in the signal processing section 204, the B/R value being about 0.1 is calculated. At this time, by referring to the look-up table in FIG. 19, the signal processing section 204 decides, as a coefficient corresponding to the B/R value being about 0.1, the coefficient W1 being 457, the coefficient W2 being 325, and the coefficient W3 being 189 (a dotted line D1 in the diagram).

In the signal processing section 204, the B signal is multiplied by the coefficient W1 being 457, the G signal is multiplied by the coefficient W2 being 325, and the R signal is multiplied by the coefficient W3 being 189. As a result, as shown in A in FIG. 20, 80 umol is calculated as the PPFD value of the B signal, 207 umol is calculated as the PPFD value of the G signal, and 373 umol is calculated as the PPFD value of the R signal. Then, by adding these values, approximately 660 umol is calculated as the PPFD value of a sunny place in the evening.

In addition, it is assumed that, in the case of sunlight of the spectral characteristic after sunset in B in FIG. 18, in the signal processing section 204, the B/R value being about 0.2 is calculated. At this time, by referring to the look-up table in FIG. 19, the signal processing section 204 decides, as a coefficient corresponding to the B/R value being about 0.2, the coefficient W1 being 546, the coefficient W2 being 333, and the coefficient W3 being 160 (a dotted line D2 in the diagram).

In the signal processing section 204, the B signal is multiplied by the coefficient W1 being 546, the G signal is multiplied by the coefficient W2 being 333, and the R signal is multiplied by the coefficient W3 being 160. As a result, as shown in B in FIG. 20, 27 umol is calculated as the PPFD value of the B signal, 33 umol is calculated as the PPFD value of the G signal, and 40 umol is calculated as the PPFD value of the R signal. Then, by adding these values, approximately 100 umol is calculated as the PPFD value after sunset.

Further, it is assumed that, in the case of sunlight of the spectral characteristic in a shady place in C in FIG. 18, in the signal processing section 204, the B/R value being about 0.2 is calculated. At this time, by referring to the look-up table in FIG. 19, the signal processing section 204 decides, as a coefficient corresponding to the B/R value being about 1.0, the coefficient W1 being 444, the coefficient W2 being 358, and the coefficient W3 being 190 (a dotted line D3 in the diagram).

In the signal processing section 204, the B signal is multiplied by the coefficient W1 being 444, the G signal is multiplied by the coefficient W2 being 358, and the R signal is multiplied by the coefficient W3 being 190. As a result, as shown in C in FIG. 20, 224 umol is calculated as the PPFD value of the B signal, 178 umol is calculated as the PPFD value of the G signal, and 98 umol is calculated as the PPFD value of the R signal. Then, by adding these values, approximately 500 umol is calculated as the PPFD value after sunset.

In this way, in the case of having used the en-tout-cas as a reference area, and in the case where sunlight has the spectral characteristic shown in FIG. 18, in the signal processing section 204 of the index calculating device 20, by referring to the look-up table in FIG. 19, the coefficient W1, the coefficient W2, and the coefficient W3 corresponding to the B/R value obtained from the measured values of the measuring section 21 are decided (S212, S213 in FIG. 14). Moreover, in the signal processing section 204, by multiplying the respective values of the B signal, the G signal, and the R signal by the respective coefficients, it is possible to calculate the PPFD value of the reference area (en-tout-cas) shown in FIG. 20 (S214 in FIG. 14).

Here, the PPFD value shown in FIG. 20 becomes the same value as the PPFD value shown in the above-mentioned. FIG. 17. Namely, in the case of having used the en-tout-cas as the reference area, by receiving the influence of reflected light, the outputs of the measuring section 21 become different from that in the case of having used the gray reflection plate. However, by using the look-up table (FIG. 19) corresponding to the case of having used the en-tout-cas, in the finally-obtained PPFD value (FIG. 20), it becomes possible to obtain the same result as the PPFD value (FIG. 17) in the case of having used the gray reflection plate.

In this connection, also in FIG. 20, similarly to FIG. 17, the PPFD values in A in FIG. 20 through C in FIG. 20 are normalized so as to make it easy to compare. Accordingly, in A in FIG. 20, it is adjusted to about 1/40 by the normalization, in B in FIG. 20, it is adjusted to about 1/4 by the normalization, and in C in FIG. 20, it is adjusted to about 1/20 by the normalization.

Moreover, in the case of having used the en-tout-cas as a reference area, the slope of the spectral characteristic for each sunlight shown in FIG. 18 and the PPFD value of the B signal, the G signal, and the R signal for each sunlight shown in FIG. 20 becomes values (known values) that can be obtained beforehand. Therefore, by obtaining the coefficient W1, the coefficient W2, and the coefficient W3 on the basis of those known values, it becomes possible to create a look-up table in FIG. 19 in the case of having used the en-tout-cas and to memorize beforehand in the memory section 206 in the index calculating device 20.

(Example of Totaling of PPFD Value)

Moreover, also in the second embodiment, similarly to the above-mentioned first embodiment, by the PPFD value calculating process (FIG. 13), since the PPFD value of the vegetation area 1 is calculated from the PPFD value of the reference area and accumulated continuously (S201 through S206), it is possible to total the PPFD values accumulated in time series in this way for each of the predetermined regions in the vegetation area 1 (S208). Then, it is possible to indicate the PPFD value for each of the noticed regions (for example, the noticed region A1 through the noticed region A5 in FIG. 8) in each time slot, or to indicate the daily average value of the PPFD values for each of the divided regions divided in the vegetation area 1 (the three dimensional graph in FIG. 9).

In the above, the second embodiment has been described. In the second embodiment, by multiplying the measured value (the value of each of the B the G signal, and the R signal) obtained by performing sensing for the measurement target region (for example, the vegetation area 1 in FIG. 6) and the reference reflection region (for example, the reference area 3 in FIG. 6) by the sensor 202 by the coefficient (the coefficient W1, the coefficient W2, and the coefficient W3) obtained from the table (the look-up table shown in FIG. 16 or FIG. 19) prepared in advance, the reference index (PPFD value) of the reference reflection region is calculated, and then, by using the reference index (PPFD value) of the reference reflection region, the measurement target region index (PPFD value) of the measurement target region can be calculated.

That is, since the sensor 202 has a plurality of pixels, it is possible to image the measurement target region and the reference reflection region as images (RGB correspondent images), and then, from the analysis result of such images, it is possible to calculate the measurement target region index of the measurement target region. Therefore, for example, even in the case of a wide range like the vegetation area 1 in the stadium, by imaging and analyzing an image that overlooks the whole vegetation area 1 in the stadium, it becomes possible to calculate the PPFD value of the vegetation area 1. With this, it is possible to cope sufficiently with scenes that require strict managements of vegetation, such as management of lawn in a stadium and management of plants in precision farming.

Moreover, in the shady area 2 (FIG. 6) overlapping with the vegetation area 1 (FIG. 6) in the stadium, its state changes greatly correspondingly to time, seasons, weathers, and the like. In the second embodiment, as the reference reflection region (reference area), the reference area 3-1 (FIG. 6) of a sunny place and the reference area 3-2 (FIG. 6) of a shady place are used, and, it is possible to calculate the PPFD values (a sunny place reference index and a shady place reference index) corresponding to the sunny place and the shady place in the vegetation area 1. Therefore, it becomes possible to grasp correctly a sunshine situation on a wide region like the vegetation area 1 in the stadium irrespective of the state of the shady area 2.

Moreover, the optical filter 201 includes the IR cut filter and the RGB color filters, and it is not necessary to use a specific optical filter corresponding to a PPFD value.

That is, the index calculating device 20 can be constituted, for example, as imaging devices, such as general digital cameras and digital video cameras that do not have specific optical filters and information terminal devices that have an imaging function. In other words, if this type of imaging devices includes the function of the signal processing section 204 and the look-up table (FIG. 16 or FIG. 19) memorized in the memory section 206, it becomes possible to execute the PPFD value calculating process shown in FIG.

13. Therefore, it becomes possible to calculate the PPFD value of the vegetation area 1 at low cost without using special devices.

In this connection, in the case where the index calculating device 20 includes a communicating function, a look-up table may be provided to the index calculating device 20 from an external server through communication networks, such as the Internet.

4. Modified Example (Constitution of Index Calculating System)

in the description mentioned in the above, as shown in FIG. 3 through FIG. 10, the constitution in the case where the index calculating device 10 or the index calculating device 20 includes all the functions, has been described. However, other device may be made to have some of the functions of the index calculating device 10 or the index calculating device 20.

Figure 21:
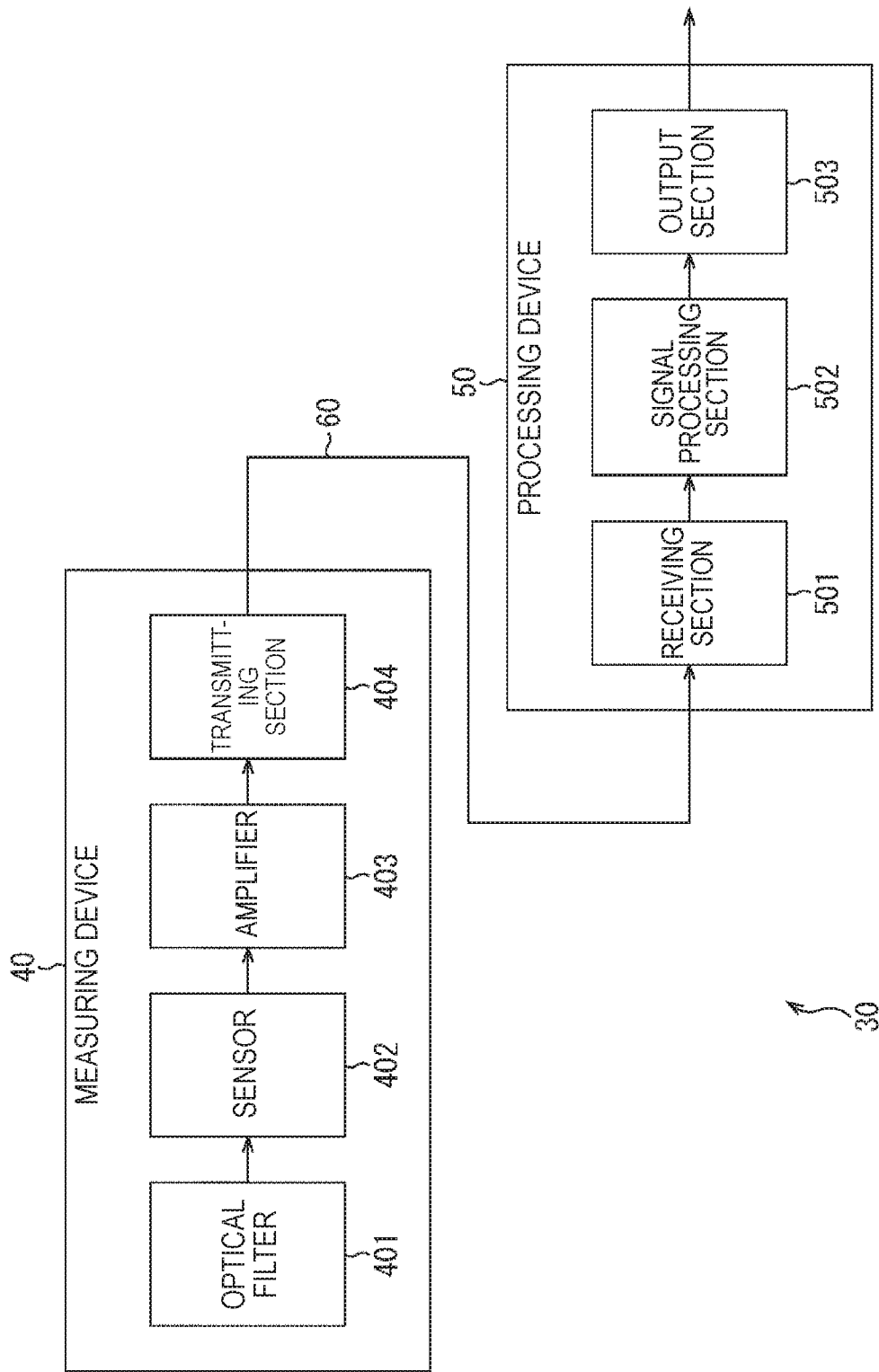
FIG. 21 is a diagram showing a constitution example of an index calculating system.

For example, FIG. 21 shows a constitution of an index calculating system 30 that includes a measuring device 40 and a processing device 50. In the index calculating system 30 in FIG. 21, the measuring device 40 corresponds to the measuring section 11 (FIG. 3) or the measuring section 21 (FIG. 10), and the processing device 50 corresponds to the processing section 12 (FIG. 3) or the processing section 22 (FIG. 10).

The measuring device 40 includes an optical filter 401, a sensor 402, an amplifier 403, and a transmitting section 404. The optical filter 401 through the amplifier 403 are made to correspond to the optical filter 101 through the amplifier 103 (FIG. 3), or the optical filter 201 through the amplifier 203 (FIG. 10). The transmitting section 404 transmits the measurement signal (measured value) output from the amplifier 403 to the processing device 50 via a transmission path 60.

The processing device 50 includes a receiving section 501, a signal processing section 502, and an output section 503. The receiving section 501 receives the measurement signal (measured value) transmitted from the measuring device 40 via the transmission path 60, and supplies the signal processing section 502.

The signal processing section 502 through the output section 503 are made to correspond to the signal processing section 104 through the output section 105 (FIG. 3), or the signal processing section 204 through the output section 205 (FIG. 10). Namely, the signal processing section 502 calculates the PPFD value of a measurement target region, such as a vegetation area by executing the PPFD value calculating process (FIG. 4) or the PPFD value calculating process (FIG. 13).

In this connection, the transmission path 60 is, for example, made communication networks, such as Internet and a telephone line, and in the case where both of the measuring device 40 and the processing device 50 have a communication function, by using wireless communication or cable communication conforming a predetermined standard, it is possible to exchange data. For example, in the case where the processing device 50 is a server disposed on the Internet, the measuring device 40 accesses the processing device 50 through the Internet, and transmits data. Furthermore, data may be made to be exchanged via removable memory media, such as an optical disc and semiconductor memory.

Moreover, the processing device 50 outputs numeric data and image data obtained by processing PPFD values to external devices, such as a display device such as a display and a memory device such as a semiconductor memory, and in addition, in the case where a display section such as a display is disposed in the processing device 50, the processing device 50 can make the display section display an image corresponding to a PPFD value. Moreover, in the case where a memory section such as a semiconductor memory is disposed in the processing device 50, it is possible to make the memory section memorize numeric data and image data of a PPFD value.

The index calculating system 30 is constituted as mentioned in the above.

(Concrete Example of Measuring Device)

Figure 22:
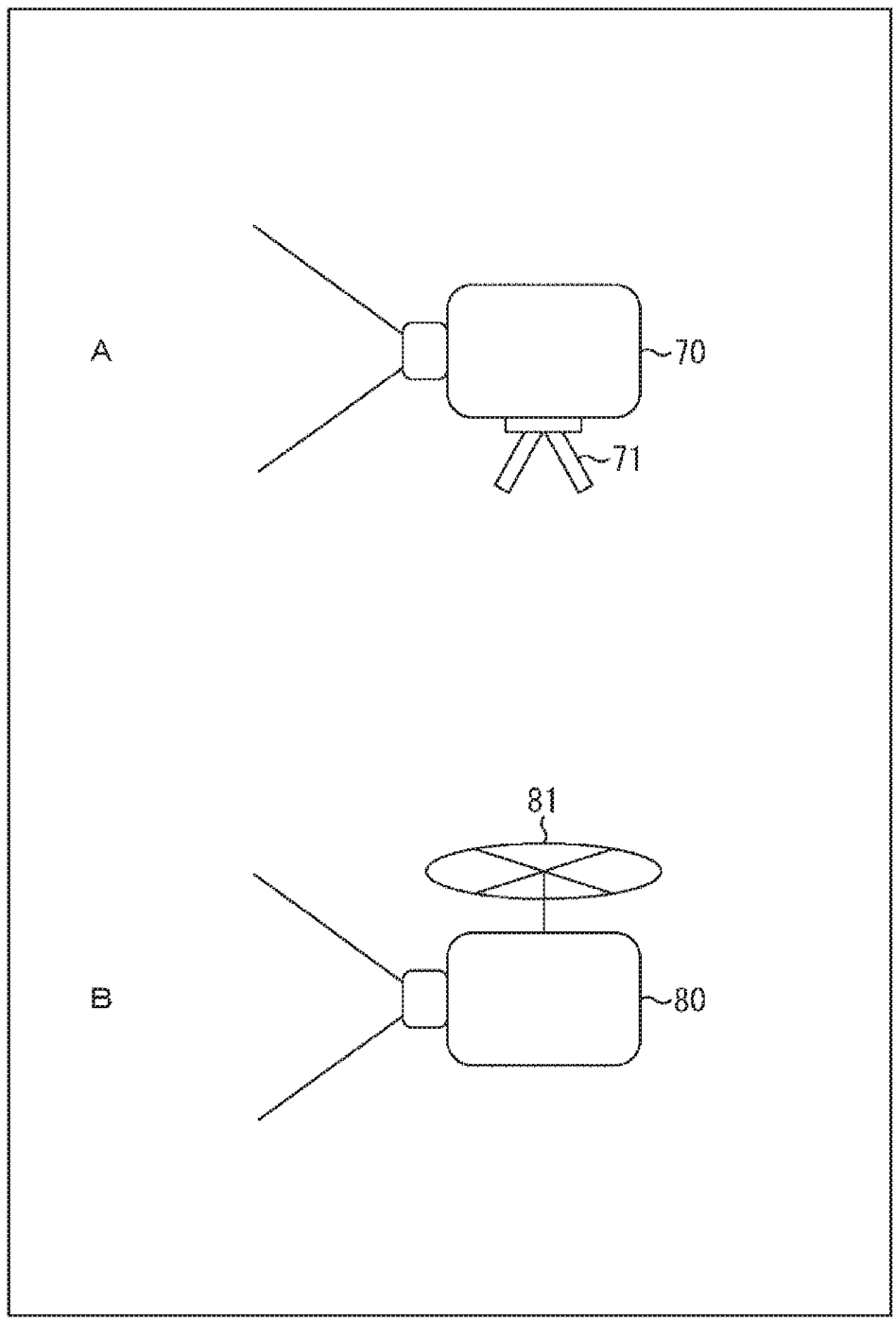
FIG. 22 is an illustration showing a concrete example of a measuring device.

In FIG. 22, as a concrete example of the measuring device 40 shown in FIG. 21, a fixed point measuring device 70 that performs fixed point observation and a mobile measuring device 80 that performs mobile observation are exemplified.

The fixed point measuring device 70 shown in A in FIG. 22 is fixed by fixing legs 71 at a position from which sensing can be performed for a measurement target region (for example, vegetation area), and transmits a measurement signal (measured value) measured at there to the processing device 50 (FIG. 21) via the transmission path 60. The processing device 50 processes the measurement signal transmitted from the fixed point measuring device 70, whereby it is possible to obtain the measurement target region index (PPFD value) of the measurement target region having been subjected to the fixed point measurement by the fixed point measuring device 70.

The mobile measuring device 80 shown in B in FIG. 22 is, for example, an unmanned aerial vehicle (UAV: Unmanned Aerial Vehicle), flies by rotation of propeller-like rotary wings 81, and performs sensing (aerial photographing) for a measurement target region (for example, vegetation area) from the sky. The mobile measuring device 80 transmits a measurement signal (measured value) measured at there to the processing device 50 (FIG. 21) via the transmission path 60. The processing device 50 processes the measurement signal transmitted from the mobile measuring device 80, whereby it is possible to obtain the measurement target region index (PPFD value) of the measurement target region having been subjected to the mobile measurement by the mobile measuring device 80.

In this connection, the mobile measuring device 80, in addition to radio control, for example, may be made to perform autonomous flight by memorizing beforehand a flight route as coordinate data and using position information, such as GPS (Global Positioning System). Moreover, although, in B in FIG. 22, the description has been given for a case where the mobile measuring device 80 is a rotary wing aircraft with the rotary wings 81, the mobile measuring device 80 may be a fixed-wing aircraft.

Moreover, the measuring device 40 may be made to be mounted on an artificial satellite. In the artificial satellite, the measurement signal (for example, measured value corresponding to a satellite image) obtained by sensing (imaging from the artificial satellite) by the measuring device 40 is transmitted to the processing device 50 (FIG. 21) via a predetermined communication path. The processing device 50 processes the measurement signal transmitted from the measuring device 40 mounted on the artificial satellite, whereby it is possible to obtain the measurement target region index (PPFD value) of the measurement target region (for example, vegetation area) measured from the artificial satellite.

(Arrangement Example of Reference Reflection Plate)

In the above-mentioned description, the description has been given for the case of using the reference area 3 (FIG. 6), such as the gray reflection plate and the en-tout-cas, as the reference reflection region (reference area) with a known reflectance. However, the reference reflection region should not be limited to the fixed (stationary) region, and may be a movable region. Here, a movable plate with a reference reflection region is referred to as a reference reflection plate (reference reflection object).

FIG. 23 shows an example in the case of attaching a reference reflection plate 91 in front of an imaging device 90. In this connection, the imaging device 90 includes a constitution corresponding to the index calculating device 10 (FIG. 3), the index calculating device 20 (FIG. 10), or the measuring device 40 (FIG. 21).

In A in FIG. 23, the reference reflection plate 91 made in a circular shape is attached at the tip (tip on a measurement target region side) of a rod-like member disposed on the imaging device 90. Moreover, B in FIG. 23 shows a situation where a vegetation area (lawn) in a stadium as a measurement target region and the reference reflection plate 91 made in the circular shape exist in the same field angle as a target (photographic subject) for which sensing is performed by the imaging device 90. With this, as the reference reflection region, even in the case of using the reference reflection plate 91, not a fixed region, it is possible to obtain the measurement target region index (PPFD value) of a measurement target region (vegetation area) by performing sensing for the measurement target region and the reference reflection plate 91 simultaneously.

In this connection, as the reference reflection plate 91, a reference reflection plate is prepared so as to have a predetermined reflectance, and it may be used. Also in this case, although a reference reflection plate can be installed at an arbitrary position, for example, as shown in FIG. 23, it can be installed at a position where sensing can be performed simultaneously with a measurement target region. Moreover, sensing may be performed for a reference reflection region (reference reflection plate) at another timing in time from that for a measurement target region.

(Concrete Example of Sensor)

In the above-mentioned description although the sensor 102 (FIG. 3) or the sensor 202 (FIG. 10) has been described as a sensor including a pixel array in which a plurality of pixels is arranged two-dimensionally, as this sensor, for example, various kinds of sensors, such as a one-dimensional line sensor and an image sensor, may be included.

(Examples Other than Look-Up Table)

In the above-mentioned description, in the second embodiment, the coefficient W has been described as being decided from the value associated with in a look-up table. However, the deciding method of the coefficient W may be other methods, for example, the coefficient W may be made to be obtained by solving a linear or nonlinear equation. Moreover, at this time, the coefficient of the equation may be made to be obtained from a look-up table.

5. Configuration of Computer

Figure 24:
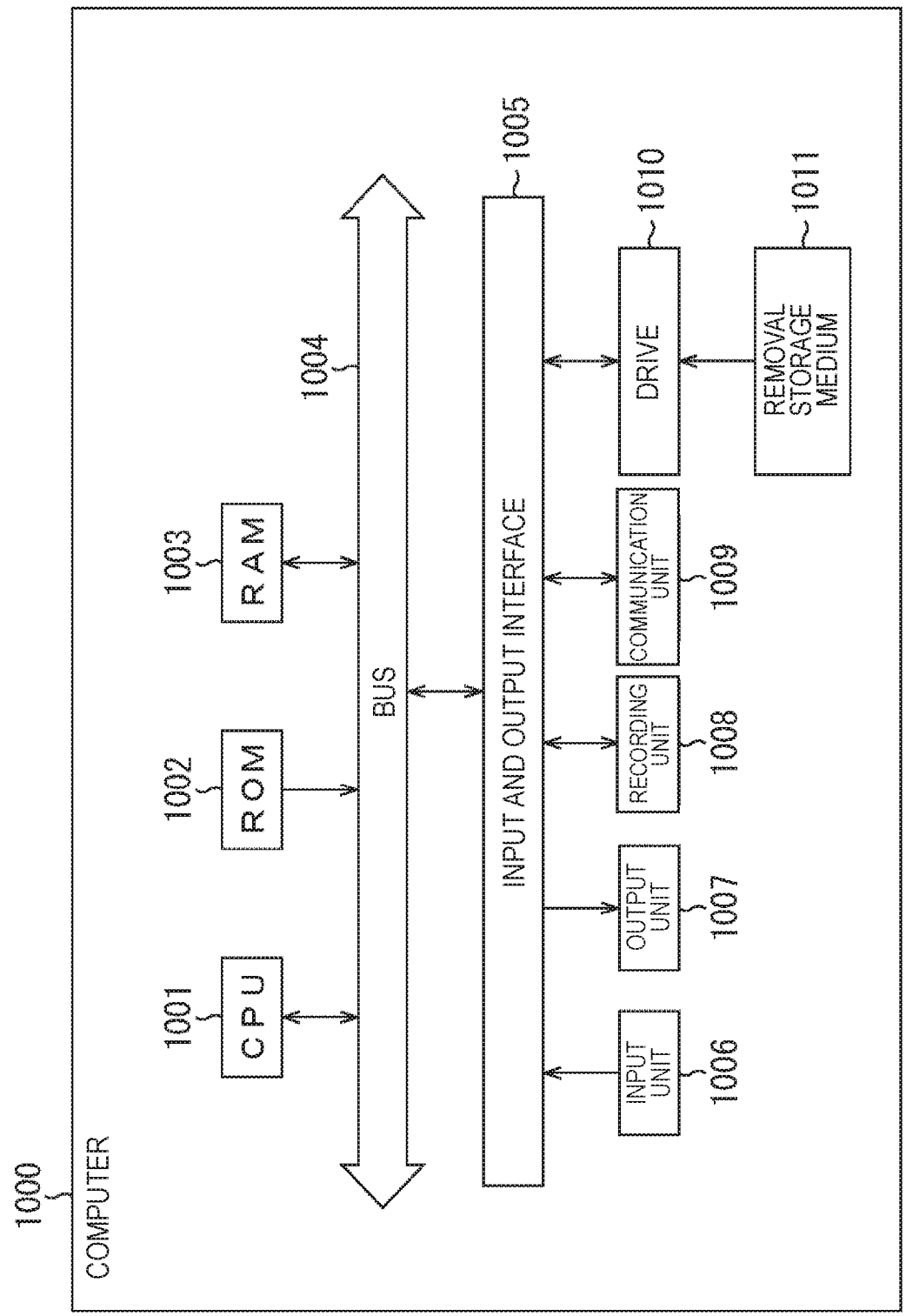
FIG. 24 is a diagram showing a constitution example of a computer.

The above-described series of processes (PPFD value calculating process) may be executed by hardware or software. In a case in which the series of processes is executed by software, a program including the software is installed on a computer. FIG. 24 is a diagram illustrating an example of a hardware configuration of a computer in which the above-described series of processes is executed by the program.

In a computer 1000, a central processing unit (CPU) 1001, a read-only memory (ROM) 1002, and a random access memory (RAM) 1003 are connected to each other by a bus 1004. An input and output interface 1005 is further connected to the bus 1004. An input unit 1006, an output unit 1007, a recording unit 1008, a communication unit 1009, and a drive 1010 are connected to the input and output interface 1005.

A keyboard, a mouse, a microphone, or the like is used as the input unit 1006. A display, a speaker, or the like is used as the output unit 1007. A hard disk, a nonvolatile memory, or the like is used as the recording unit 1008. A network interface or the like is used as the communication unit 1009. The drive 1010 drives the storage medium 1011 such as a magnetic disk, an optical disc, a magneto-optical disc, or a semiconductor memory.

In the computer 1000 that has the above-described configuration, the CPU 1001 executes the above-described series of processes by loading a program recorded on the ROM 1002 or the recording unit 1008 to the RAM 1003 via the input and output interface 1005 and the bus 1004 and executing the program.

The program executed by the computer 1000 (the CPU 1001) can be recorded on, for example, the removable storage medium 1011 such as a package medium for supply. In addition, the program can be supplied via a wired or wireless transmission medium such as a local area network, the Internet, or digital broadcasting.

In the computer 1000, the program can be installed on the recording unit 1008 via the input and output interface 1005 by mounting the removable storage medium 1011 on the drive 1010. In addition, the program can be received by the communication unit 1009 via a wired or wireless transmission medium and can be installed on the recording unit 1008. Additionally, the program can be installed in advance on the ROM 1002 or the recording unit 1008.

Here, in the present specification, processes executed by the computer in accordance with the program may not necessarily be executed chronologically in the order described as a flowchart. That is, the processes executed by the computer in accordance with the program also include processes executed in parallel or individually (for example, parallel processes or processes by objects). In addition, the program may be processed by one computer (processor) or may be distributed and processed by a plurality of computers.

Moreover, embodiments of the present technology are not limited to the above-described embodiments, but various changes can be made within the scope of the present technology without departing from the gist of the present technology. For example, an embodiment in which all or some of the plurality of the above-mentioned embodiments are combined, may be adopted.

Additionally, the present technology may also be configured as below.

(1)

An information processing device, including:

a calculating section that calculates, on a basis of a measured value of a reference reflection region obtained by performing sensing for the reference reflection region, a reference index including a sunny place reference index being an index with regard to light entering a sunny region in the reference reflection region and a shady place reference index being an index with regard to light entering a shady region in the reference reflection region, and calculates, on a basis of a measured value of a measurement target region obtained by performing sensing for the measurement target region and the reference index, a measurement target region index including a sunny measurement target region index being an index with regard to light entering a sunny region in the measurement target region and a shady measurement target region index being an index with regard to light entering a shady region in the measurement target region.

(2)

The information processing device according to (1), in which the calculating section calculates a sunny place degree and a shady place degree for each of divided regions obtained by dividing the measurement target region into a plurality of regions on a basis of the measured value of the measurement target region, and calculates the sunny measurement target region index and the shady measurement target region index on a basis of the sunny place degree and the shady place degree of each of the divided regions, and the reference index.

(3)

The information processing device according to (2), in which the measured value of the reference reflection region and the measured value of the measurement target region are obtained by performing sensing for light having passed through an optical filter including an IR cut filter and an RGB color filter.

(4)

The information processing device according to (3), in which the calculating section calculates the sunny place reference index and shady place reference index on a basis of a table in which a value obtained from the measured value of the reference reflection region and a coefficient for calculating the reference index are associated with each other.

(5)

The information processing device according to (4), in which the coefficient is a value corresponding to a slope of spectral characteristic of light obtained from the measured value of the reference reflection region, and the calculating section calculates the sunny place reference index and the shady place reference index by multiplying the measured value of the reference reflection region by the coefficient.

(6)

The information processing device according to (5), in which the measured value includes a B component, a G component, and an R component, and the calculating section calculates a ratio of the B component and the R component, a ratio of the B component and the G component, and a ratio of the G component and the R component from the B component, the G component, and the R component, decides a coefficient of each of the B component, the G component, and the R component from the table on a basis of the ratio of the B component and the R component, the ratio of the B component and the G component, and the ratio of the G component and the R component, and calculates the sunny place reference index and the shady place reference index for each color component by multiplying a measured value of the B component by the coefficient of the B component, multiplying a measured value of the G component by the coefficient of the G component, and multiplying a measured value of the R component by the coefficient of the R component.

(7)

The information processing device according to (2), in which the measured value of the reference reflection region and the measured value of the measurement target region are obtained by performing sensing for light having passed through an optical filter corresponding to an index with regard to light entering each region.

(8)

The information processing device according to any of (1) to (7), in which the measured value of the reference reflection region and the measured value of the measurement target region are obtained by performing sensing for the reference reflection region and the measurement target region simultaneously.

(9)

The information processing device according to any of (1) to (8), in which the measurement target region is a region with regard to vegetation, and the measuring target region index is an index indicating how much light entering a plant acts on photosynthesis.

(10)

The information processing device according to 9), in which the measuring target region index is photosynthetic photon flux density (PPFD).

(11)

The information processing device according to (10), further including: an output section that outputs information corresponding to a value of the photosynthetic photon flux density (PPFD).

(12)

The information processing device according to (11), in which the output section outputs information for each time slot with regard to the photosynthetic photon flux density (PPFD) of vegetation within a specific region in the region with regard to the vegetation.

(13)

The information processing device according to (11), in which the output section outputs information in units of common time with regard to the photosynthetic photon flux density (PPFD) for each partial region of the region with regard to the vegetation.

(14)

The information processing device according to any of (1) to (13), further including:

a sensor that performs sensing for the reference reflection region and the measurement target region.

(15)

The information processing device according to (14), in which the sensor includes a plurality of pixels arranged two-dimensionally.

(16)

An information processing method of an information processing device, the information processing method including steps of:

causing the information processing device to calculate, on a basis of a measured value of a reference reflection region obtained by performing sensing for the reference reflection region, a reference index including a sunny place reference index being an index with regard to light entering a sunny region in the reference reflection region and a shady place reference index being an index with regard to light entering a shady region in the reference reflection region, and causing the information processing device to calculate, on a basis of a measured value of a measurement target region obtained by performing sensing for the measurement target region and the reference index, a measurement target region index including a sunny measurement target region index being an index with regard to light entering a sunny region in the measurement target region and a shady measurement target region index being an index with regard to light entering a shady region in the measurement target region.

(17)

A program that causes a computer to function as an information processing device including:
 a calculating section that
  calculates, on a basis of a measured value of a reference reflection region obtained by performing sensing for the reference reflection region, a reference index including a sunny place reference index being an index with regard to light entering a sunny region in the reference reflection region and a shady place reference index being an index with regard to light entering a shady region in the reference reflection region, and
  calculates, on a basis of a measured value of a measurement target region obtained by performing sensing for the measurement target region and the reference index, a measurement target region index including a sunny measurement target region index being an index with regard to light entering a sunny region in the measurement target region and a shady measurement target region index being an index with regard to light entering a shady region in the measurement target region.

REFERENCE SIGNS LIST 10 index calculating device
11 measuring section
12 processing section
20 index calculating device
21 measuring section
22 processing section
30 measuring system
40 measuring device
50 processing device
70 fixed point measuring device
80 mobile measuring device
90 imaging device
101 optical filter
102 sensor
103 amplifying section
104 signal processing section
105 output section
201 optical filter
201A, 201B arrangement pattern
202 sensor
203 amplifying section
204 signal processing section
205 output section
206 memory section
221-1 B/R value calculating section
221-2 B/G value calculating section
221-3 G/R value calculating section
222-1 W1 deciding section
222-2 W2 deciding section
222-3 W3 deciding section
223-1 multiplier
223-2 multiplier
223-3 multiplier
401 optical filter
402 sensor
403 amplifying section
404 transmitting section
501 receiving section
502 signal processing section
503 output section
1000 computer
1001 CPU

The invention claimed is:
1. An information processing device, comprising:
 a calculating section that
  calculates, on a basis of a measured value of a reference reflection region obtained by performing sensing for the reference reflection region, a reference index including a sunny place reference index being an index with regard to light entering a sunny region in the reference reflection region and a shady place reference index being an index with regard to light entering a shady region in the reference reflection region, and
  calculates, on a basis of a measured value of a measurement target region obtained by performing sensing for the measurement target region and the reference index, a measurement target region index including a sunny measurement target region index being an index with regard to light entering a sunny region in the measurement target region and a shady measurement target region index being an index with regard to light entering a shady region in the measurement target region.

2. The information processing device according to claim 1, wherein the calculating section
 calculates a sunny place degree and a shady place degree for each of divided regions obtained by dividing the measurement target region into a plurality of regions on a basis of the measured value of the measurement target region, and
 calculates the sunny measurement target region index and the shady measurement target region index on a basis of the sunny place degree and the shady place degree of each of the divided regions, and the reference index.

3. The information processing device according to claim 2, wherein the measured value of the reference reflection region and the measured value of the measurement target region are obtained by performing sensing for light having passed through an optical filter including an IR cut filter and an RGB color filter.

4. The information processing device according to claim 3, wherein the calculating section calculates the sunny place reference index and shady place reference index on a basis of a table in which a value obtained from the measured value of the reference reflection region and a coefficient for calculating the reference index are associated with each other.

5. The information processing device according to claim 4, wherein the coefficient is a value corresponding to a slope of spectral characteristic of light obtained from the measured value of the reference reflection region, and
 the calculating section calculates the sunny place reference index and the shady place reference index by multiplying the measured value of the reference reflection region by the coefficient.

6. The information processing device according to claim 5, wherein the measured value includes a B component, a G component, and an R component, and
 the calculating section
  calculates a ratio of the B component and the R component, a ratio of the B component and the G component, and a ratio of the G component and the R component from the B component, the G component, and the R component,
  decides a coefficient of each of the B component, the G component, and the R component from the table on a basis of the ratio of the B component and the R component, the ratio of the B component and the G component, and the ratio of the G component and the R component, and calculates the sunny place reference index and the shady place reference index for each color component by multiplying a measured value of the B component by the coefficient of the B component, multiplying a measured value of the G component by the coefficient of the G component, and multiplying a measured value of the R component by the coefficient of the R component.

7. The information processing device according to claim 2, wherein the measured value of the reference reflection region and the measured value of the measurement target region are obtained by performing sensing for light having passed through an optical filter corresponding to an index with regard to light entering each region.

8. The information processing device according to claim 1, wherein the measured value of the reference reflection region and the measured value of the measurement target region are obtained by performing sensing for the reference reflection region and the measurement target region simultaneously.

9. The information processing device according to claim 1, wherein the measurement target region is a region with regard to vegetation, and the measuring target region index is an index indicating how much light entering a plant acts on photosynthesis.

10. The information processing device according to claim 9, wherein the measuring target region index is photosynthetic photon flux density (PPFD).

11. The information processing device according to claim 10, further comprising:

an output section that outputs information corresponding to a value of the photosynthetic photon flux density (PPFD).

12. The information processing device according to claim 11, wherein the output section outputs information for each time slot with regard to the photosynthetic photon flux density (PPFD) of vegetation within a specific region in the region with regard to the vegetation.

13. The information processing device according to claim 11, wherein the output section outputs information in units of common time with regard to the photosynthetic photon flux density (PPFD) for each partial region of the region with regard to the vegetation.

14. The information processing device according to claim 1, further comprising:

a sensor that performs sensing for the reference reflection region and the measurement target region.

15. The information processing device according to claim 14, wherein the sensor includes a plurality of pixels arranged two-dimensionally.

16. An information processing method of an information processing device, the information processing method comprising steps of:

causing the information processing device to calculate, on a basis of a measured value of a reference reflection region obtained by performing sensing for the reference reflection region, a reference index including a sunny place reference index being an index with regard to light entering a sunny region in the reference reflection region and a shady place reference index being an index with regard to light entering a shady region in the reference reflection region, and causing the information processing device to calculate, on a basis of a measured value of a measurement target region obtained by performing sensing for the measurement target region and the reference index, a measurement target region index including a sunny measurement target region index being an index with regard to light entering a sunny region in the measurement target region and a shady measurement target region index being an index with regard to light entering a shady region in the measurement target region.

17. A non-transitory computer readable device comprising a program that causes a computer to function as an information processing device comprising:

a calculating section that calculates, on a basis of a measured value of a reference reflection region obtained by performing sensing for the reference reflection region, a reference index including a sunny place reference index being an index with regard to light entering a sunny region in the reference reflection region and a shady place reference index being an index with regard to light entering a shady region in the reference reflection region, and calculates, on a basis of a measured value of a measurement target region obtained by performing sensing for the measurement target region and the reference index, a measurement target region index including a sunny measurement target region index being an index with regard to light entering a sunny region in the measurement target region and a shady measurement target region index being an index with regard to light entering a shady region in the measurement target region.

* * * * *